United States Patent
Noguchi

(10) Patent No.: US 12,228,647 B2
(45) Date of Patent: Feb. 18, 2025

(54) DISTANCE-MEASUREMENT APPARATUS AND DISTANCE-MEASUREMENT METHOD

(71) Applicant: NEC Corporation, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 986 days.

(21) Appl. No.: 17/284,002

(22) PCT Filed: Oct. 17, 2018

(86) PCT No.: PCT/JP2018/038657
§ 371 (c)(1),
(2) Date: Apr. 9, 2021

(87) PCT Pub. No.: WO2020/079776
PCT Pub. Date: Apr. 23, 2020

(65) Prior Publication Data
US 2021/0356590 A1 Nov. 18, 2021

(51) Int. Cl.
*G01C 3/08* (2006.01)
*G01S 7/484* (2006.01)
(Continued)

(52) U.S. Cl.
CPC .............. *G01S 17/26* (2020.01); *G01S 7/484* (2013.01); *G01S 7/4861* (2013.01)

(58) Field of Classification Search
CPC ......... G01S 17/26; G01S 7/484; G01S 7/4861
See application file for complete search history.

(56) References Cited

U.S. PATENT DOCUMENTS 5,164,733 A   11/1992   Nettleton et al.
6,559,932 B1*  5/2003   Halmos .................. G01S 17/50
                                                          356/28.5
(Continued)

FOREIGN PATENT DOCUMENTS

DE   3142438 C1   2/1983
EP   1397697 A2   3/2004
(Continued)

OTHER PUBLICATIONS

International Search Report of PCT Application No. PCT/JP2018/038657 mailed Dec. 18, 2018.
(Continued)

Primary Examiner — Mark Hellner

(57) ABSTRACT

A generation unit (2) generates a plurality of transmission pulses of which the strength of an optical signal changes in a pulse-like manner. Note that the generation part (2) generates a plurality of transmission pulses having frequency offsets different from each other. The transmission unit (4) repeatedly transmits transmission pulses generated by the generation unit (2). The reception part (6) receives reflected pulses of the respective transmission pulses reflected on a distance-measurement-target object. The detection unit (8) detects the frequency offsets of the reflected pulses received by the reception unit (6). The distance calculation unit (10) calculates a distance to the distance-measurement-target object based on the receiving timings of the reflected pulses received by the reception unit (6) and the transmitting timings of the transmission pulses corresponding to the frequency offsets detected from the reflected pulses.

12 Claims, 13 Drawing Sheets

(51) Int. Cl.
*G01S 7/4861* (2020.01)
*G01S 17/26* (2020.01)

(56) References Cited

U.S. PATENT DOCUMENTS

| | | |
|---|---|---|
| 2011/0116072 A1 | 5/2011 | Rousseau |
| 2014/0160461 A1 | 6/2014 | Van der Tempel et al. |
| 2016/0011312 A1 | 1/2016 | Leyva |
| 2018/0224547 A1* | 8/2018 | Crouch .................. G01S 17/26 |
| 2018/0267152 A1 | 9/2018 | McMichael et al. |
| 2018/0284279 A1 | 10/2018 | Campbell et al. |
| 2019/0033451 A1 | 1/2019 | Koyama et al. |
| 2019/0257927 A1* | 8/2019 | Yao ........................ G01S 7/4815 |
| 2020/0049799 A1* | 2/2020 | Ando ....................... G01S 7/484 |

FOREIGN PATENT DOCUMENTS

| | | | |
|---|---|---|---|
| JP | S60-027875 A | 2/1985 | |
| JP | H05-060648 A | 3/1993 | |
| JP | 2014-505861 A | 3/2014 | |
| JP | 2014522979 A | 9/2014 | |
| JP | 2016169985 A * | 9/2016 | ........... G01S 7/4915 |
| JP | 6223644 B1 * | 11/2017 | ............. G01S 17/26 |
| WO | 2017134707 A1 | 8/2017 | |

OTHER PUBLICATIONS

Japanese Office Action for JP Application No. 2020-551650 mailed on Apr. 12, 2022 with English Translation.
Extended European Search Report for EP Application No. EP18937313.7 dated on Aug. 27, 2021.

* cited by examiner

DISTANCE-MEASUREMENT APPARATUS AND DISTANCE-MEASUREMENT METHOD

This application is a National Stage Entry of PCT/JP2018/038657 filed on Oct. 17, 2018, the contents of all of which are incorporated herein by reference, in their entirety.

TECHNICAL FIELD

The present invention relates to a distance-measurement apparatus and a distance-measurement method, and in particular to a distance-measurement apparatus and a distance-measurement method for measuring a distance by transmitting a pulse and receiving its reflection.

BACKGROUND ART

As a method for measuring a distance to a distance-measurement-target object, i.e., an object to which a distance is to be measured, there is a time-of-flight (Time of Flight; ToF) method. In the ToF method, a distance to a distance-measurement-target object, i.e., an object to which a distance is to be measured, is calculated by emitting a modulated optical pulse toward the distance-measurement-target object and receiving a reflection of the modulated optical pulse coming from the distance-measurement-target object. Note that the optical pulse may be periodically and repeatedly transmitted.

In relation to this technique, Patent Literature 1 discloses a method for providing distance information of a scene by using a time-of-flight sensor or a time-of-flight camera. The method disclosed in Patent Literature 1 includes: emitting a periodic optical signal toward a scene according to a modulation signal based on a clock timing having a reference frequency spread by periodic perturbation having a certain perturbation frequency and a certain perturbation period; receiving a reflection of the periodic optical signal from the scene; evaluating, for the received reflection of the periodic optical signal, time-of-flight information over a set of a plurality of measurement durations according to the modulation signal; and deriving distance information from the time-of-flight information for the received reflection. Note that each measurement duration included in the set is an integer multiple or a half integer multiple of the perturbation period, and the average of the reference frequencies is kept constant over the whole set of measurement durations.

CITATION LIST

Patent Literature

Patent Literature 1: Japanese Unexamined Patent Application Publication No. 2014-522979

SUMMARY OF INVENTION

Technical Problem

When a distance to a distance-measurement-target object is long or the transmission period of repeatedly transmitted transmission pulses is short, in some cases, the time from when an optical pulse is transmitted to when reflected light of the optical pulse is received becomes longer than the transmission period of transmission pulses. In such a case, there is a possibility that it is impossible to determine which transmission pulse the received light, i.e., the reflected light corresponds to, and hence impossible to determine at which timing the transmission pulse was transmitted. In other words, there is a possibility that it is impossible to associate the received reflected light with the transmission pulse. In such a case, there is a possibility that it is impossible to properly measure the distance. Note that, in the technique disclosed in Patent Literature 1, the reflected light is not associated with the emitted optical signal. Therefore, there is a possibility that it is impossible to properly measure a distance in the technique disclosed in Patent Literature 1.

The present disclosure has been made to solve the above-described problems and an object thereof is to provide a distance-measurement apparatus and a distance-measurement method capable of properly measuring a distance to a distance-measurement-target object irrespective of the distance thereto or the transmission period of transmission pulses.

Solution to Problem

A distance-measurement apparatus according to the present disclosure includes: generation means for generating a plurality of transmission pulses of which a strength of an optical signal changes in a pulse-like manner, the plurality of transmission pulses having frequency offsets different from each other with respect to a reference frequency; transmission means for repeatedly transmitting the generated transmission pulses; reception means for receiving reflected pulses of the transmission pulses reflected on a distance-measurement-target object; detection means for detecting frequency offsets of the received reflected pulses; and distance calculation means for calculating a distance to the distance-measurement-target object based on receiving timings of the received reflected pulses and transmitting timings of the transmission pulses corresponding to the frequency offsets detected from the reflected pulses.

Further, a distance-measurement method according to the present disclosure includes: generating a plurality of transmission pulses of which a strength of an optical signal changes in a pulse-like manner, the plurality of transmission pulses having frequency offsets different from each other with respect to a reference frequency; repeatedly transmitting the generated transmission pulses; receiving reflected pulses of the transmission pulses reflected on a distance-measurement-target object; detecting frequency offsets of the received reflected pulses; and calculating a distance to the distance-measurement-target object based on receiving timings of the received reflected pulses and transmitting timings of the transmission pulses corresponding to the frequency offsets detected from the reflected pulses.

Advantageous Effects of Invention

According to the present disclosure, it is possible to provide a distance-measurement apparatus and a distance-measurement method capable of properly measuring a distance to a distance-measurement-target object irrespective of the distance thereto or the transmission period of transmission pulses.

DESCRIPTION OF EMBODIMENTS

Overview of Example Embodiment According to Present Disclosure

Figure 1:
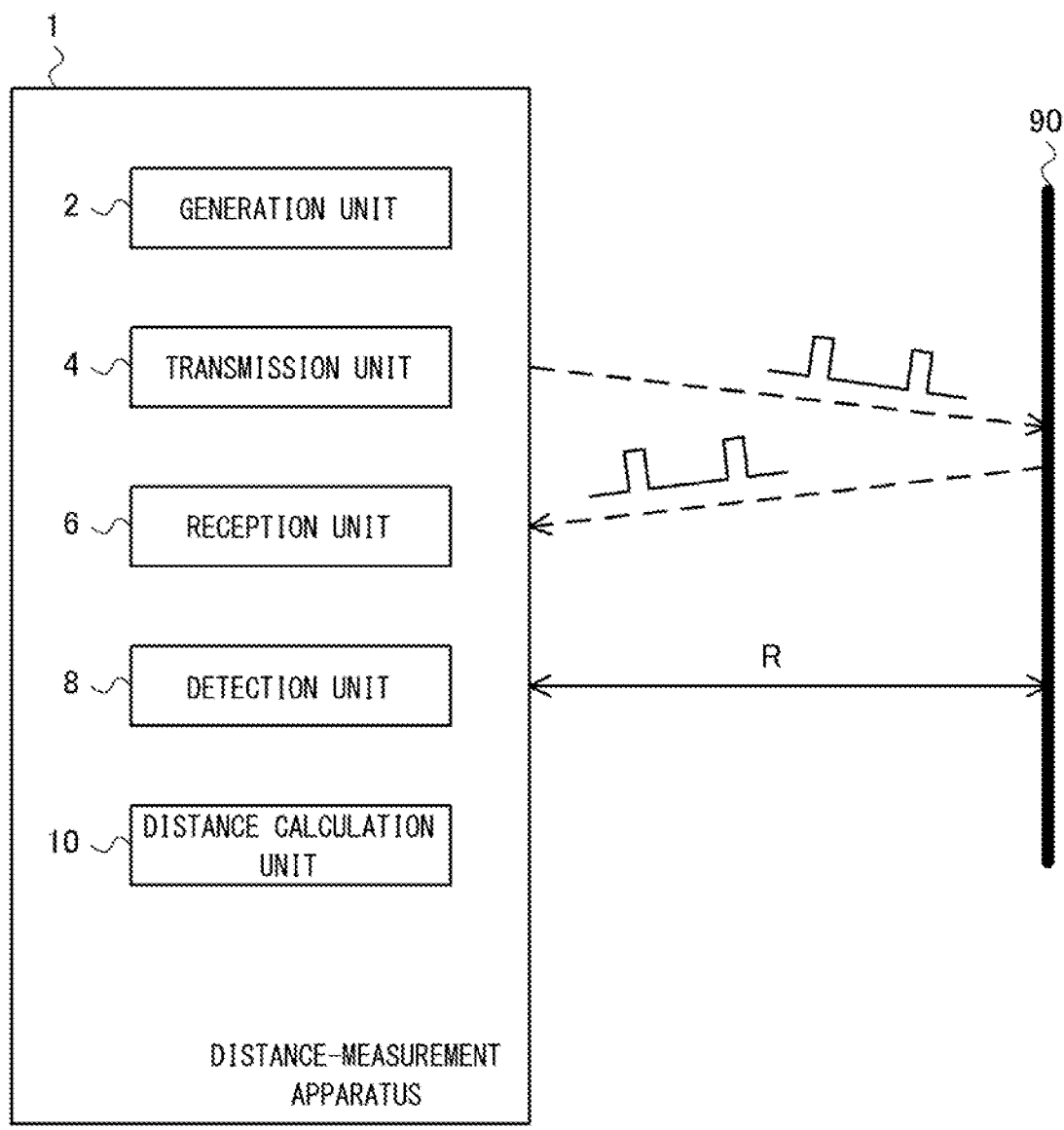
FIG. 1 schematically shows a distance-measurement apparatus according to an example embodiment of the present disclosure.
Figure 2:
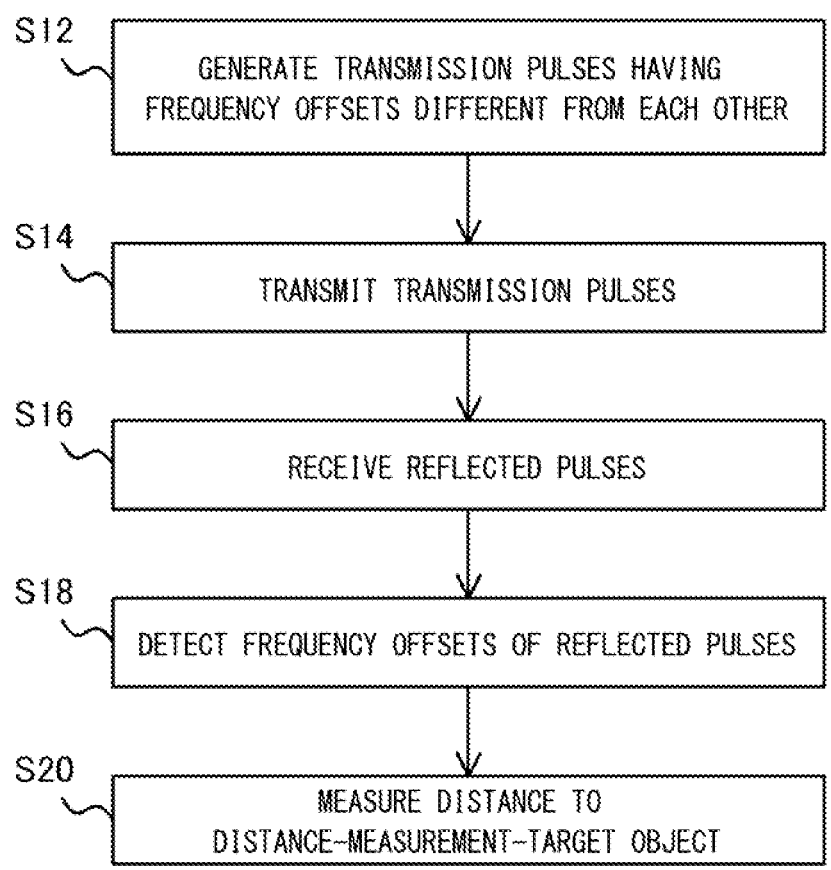
FIG. 2 schematically shows a distance-measurement method performed by a distance-measurement apparatus according to an example embodiment of the present disclosure.

Prior to describing an example embodiment according to the present disclosure, an overview of the example embodiment according to the present disclosure will be described. FIG. 1 schematically shows a distance-measurement apparatus 1 according to an example embodiment in accordance with the present disclosure. Further, FIG. 2 shows an outline of a distance-measurement method performed by the distance-measurement apparatus 1 according to the example embodiment in accordance with the present disclosure.

The distance-measurement apparatus 1 includes a generation unit 2 that functions as generation means, a transmission unit 4 that functions as transmission means, a reception unit 6 that functions as reception means, a detection unit 8 that functions as detection means, and a distance calculation unit 10 that functions as distance calculation means. The generation unit 2 generates a plurality of transmission pulses of which the strength of an optical signal changes in a pulse-like manner. Note that the generation unit 2 generates a plurality of transmission pulses having frequency offsets different from each other (step S12). Note that the frequency offset is a deviation (an offset) from a certain reference frequency.

The transmission unit 4 repeatedly transmits transmission pulses generated by the generation unit 2 (step S14). The reception unit 6 receives reflected pulses of the transmission pulses reflected on a distance-measurement-target object 90 (step S16). The detection unit 8 detects the frequency offsets of the reflected pulses received by the reception unit 6 (step S18). The distance calculation unit 10 calculates a distance R to the distance-measurement-target object 90 based on the receiving timings of the reflected pulses received by the reception unit 6 and the transmitting timings of the transmission pulses corresponding to the frequency offsets detected from the reflected pulses (step S20).

Figure 3:
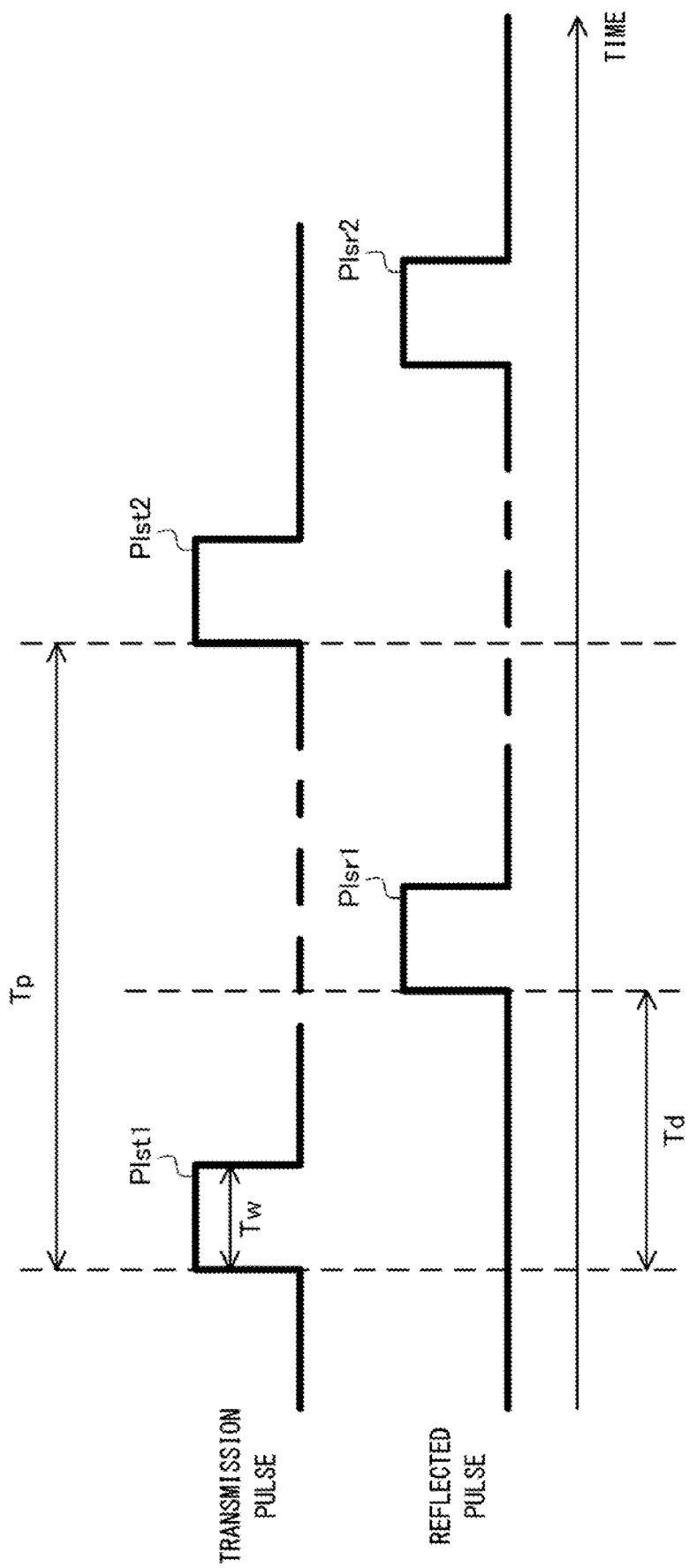
FIG. 3 is a diagram for explaining an outline of a method for calculating a distance to a distance-measurement-target object by using pulses.

FIG. 3 is a diagram for explaining an outline of a method for calculating a distance to a distance-measurement-target object 90 by using pulses. FIG. 3 shows the principle of operations according to a ToF method. By the transmission unit 4, transmission pulses Plst1 and Plst2 are transmitted at a transmission period (a pulse period) Tp. Note that a pulse width, i.e., a width of each transmission pulse is represented by Tw. Then, when the transmission pulse Plst1 is reflected on the distance-measurement-target object 90, a reflected pulse Plsr1, which is reflected light of the transmission pulse Plst1, is received by the reception unit 6. Further, when the transmission pulse Plst2 is reflected on the distance-measurement-target object 90, a reflected pulse Plsr2, which is reflected light of the transmission pulse Plst2, is received by the reception unit 6.

Further, a time difference between a time at which the transmission pulse Plst1 is transmitted and a time at which the reflected pulse Plsr1 is received, i.e., the flight time of the light (the pulse) is represented by Td. Further, the speed of light is represented by c. In this case, the distance R to the distance-measurement-target object 90 is expressed by the below-shown Expression 1.

$$R = c \times Td/2 \qquad \text{(Expression 1)}$$

In this way, the distance R is calculated by the distance calculation unit 10.

In the example shown in FIG. 3, the two transmission pulses Plst1 and Plst2 are transmitted at the pulse period Tp, and the reflected pulses Plsr1 and Plsr2, which are the reflected light of the transmission pulses Plst1 and Plst2, respectively, are received. Note that when the distance to the distance-measurement-target object 90 is long, in some cases, the time difference Td becomes longer than the pulse period Tp. Further, even when the pulse period Tp is short, in some cases, the time difference Td becomes longer than the pulse period Tp. That is, depending on the distance to the distance-measurement-target object 90 or the pulse period, the relation Td>Tp holds. In such a case, the next transmission pulse Plst2 is transmitted before the reflected pulse Plsr1 is received. In this case, if it is impossible to determine whether the received reflected pulse Plsr1 is the reflected light of the transmission pulse Plst1 or the reflected light of the transmission pulse Plst2, there is a possibility that the distance cannot be properly measured. That is, if the distance is measured from the time difference between the transmitting time of the transmission pulse Plst2 and the receiving time of the reflected pulse Plsr1, a distance shorter than the actual distance to the distance-measurement-target object 90 is calculated.

In contrast to this, the distance-measurement apparatus 1 according to this example embodiment is configured to generate a transmission pulse Plst1 and a transmission pulse Plst2 in such a manner that these transmission pulses Plst1 and Plst2 have frequency offsets different from each other. Further, the distance-measurement apparatus 1 according to this example embodiment detects the frequency offset of the received reflected pulse Plsr1 and associates the transmission pulse Plst1 and the reflected pulse Plsr1 with each other.

Therefore, the distance-measurement apparatus 1 and the distance-measurement method according to this example embodiment can properly measure a distance to a distancemeasurement-target object irrespective of the distance thereto or the transmission period of transmission pulses.

First Example Embodiment

Figure 4:
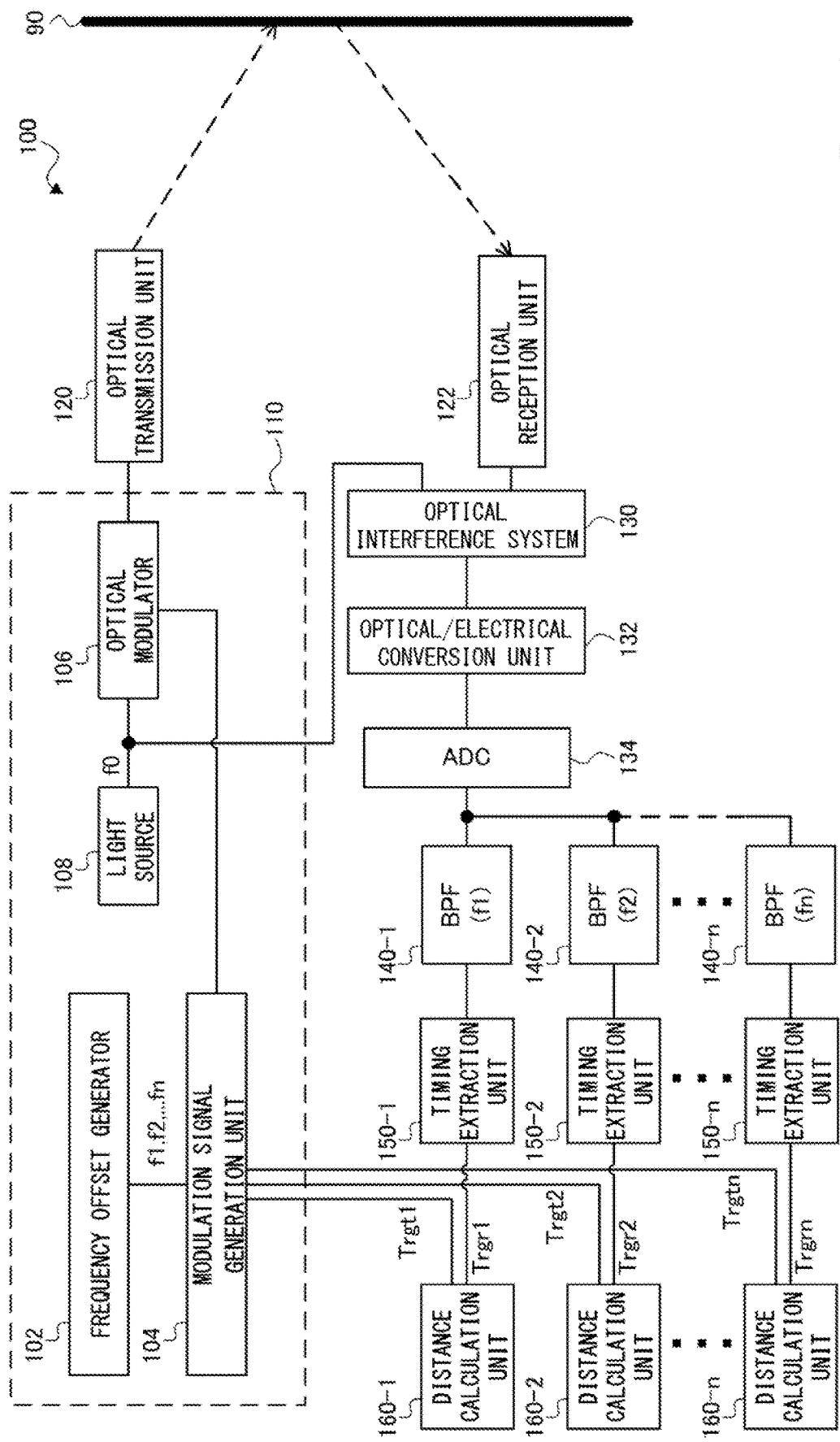
FIG. 4 shows a configuration of a distance-measurement apparatus according to a first example embodiment.

Next, a first example embodiment will be described. FIG. 4 shows a configuration of a distance-measurement apparatus 100 according to the first example embodiment. The distance-measurement apparatus 100 according to the first example embodiment includes, as a transmitting-side module, a frequency offset generator 102, a modulation signal generation unit 104, an optical modulator 106, a light source 108, and an optical transmission unit 120. The frequency offset generator 102, the modulation signal generation unit 104, the optical modulator 106, and the light source 108 constitute a pulse generation unit 110 that generates a plurality of transmission pulses having frequency offsets different from each other. This pulse generation unit 110 corresponds to the generation unit 2 shown in FIG. 1. Further, the optical transmission unit 120 corresponds to the transmission unit 4 shown in FIG. 1.

Further, the distance-measurement apparatus 100 according to the first example embodiment includes, as a receiving-side module, an optical reception unit 122, an optical interference unit 130, an optical/electrical conversion unit 132, and an AD converter 134. The optical reception unit 122 corresponds to the reception unit 6 shown in FIG. 1. Further, the optical interference unit 130 corresponds to the detection unit 8 shown in FIG. 1.

Further, the distance-measurement apparatus 100 according to the first example embodiment includes bandpass filters 140-1 to 140-$n$, timing extraction units 150-1 to 150-$n$, and distance calculation units 160-1 to 160-$n$. Note that n is an integer equal to or greater than two. The distance calculation units 160-1 to 160-$n$ correspond to the distance calculation unit 10 shown in FIG. 1. Further, in the following description, when the plurality of bandpass filters 140-1 to 140-$n$ or the like are not distinguished from each other, they may be collectively referred to as the bandpass filter(s) 140 or the like. Note that n represents the number of frequency offsets. Further, in the first example embodiment, the frequency offsets are represented by f1, f2, . . . , and fn. Therefore, the bandpass filters 140-1 to 140-$n$ correspond to the frequency offsets f1 to fn, respectively. Similarly, the timing extraction units 150-1 to 150-$n$ correspond to the frequency offsets f1 to fn, respectively. Further, the distance calculation units 160-1 to 160-$n$ correspond to the frequency offsets f1 to fn, respectively. Note that each of the above-described components can be implemented by some kind of a device or a circuit such as an arithmetic circuit or the like. The arithmetic circuit is, for example, an FPGA (Field-Programmable Gate Array) or the like.

The frequency offset generator 102 outputs frequency offset information which is information indicating a plurality of frequency offsets, i.e., a plurality of offsets from a reference frequency f0 to the modulation signal generation unit 104. Note that the frequency offset information indicates the frequency offsets f1, f2, . . . , fn. Note that the frequency offset generator 102 may output the frequency offset information indicating the frequency offsets f1, f2, . . . , fn, respectively, to the modulation signal generation unit 104 at each pulse period Tp. That is, the frequency offset generator 102 may output frequency offset information indicating the frequency offset f1, and then, after a time Tp has elapsed, output frequency offset information indicating the frequency offset f2.

Figure 5:
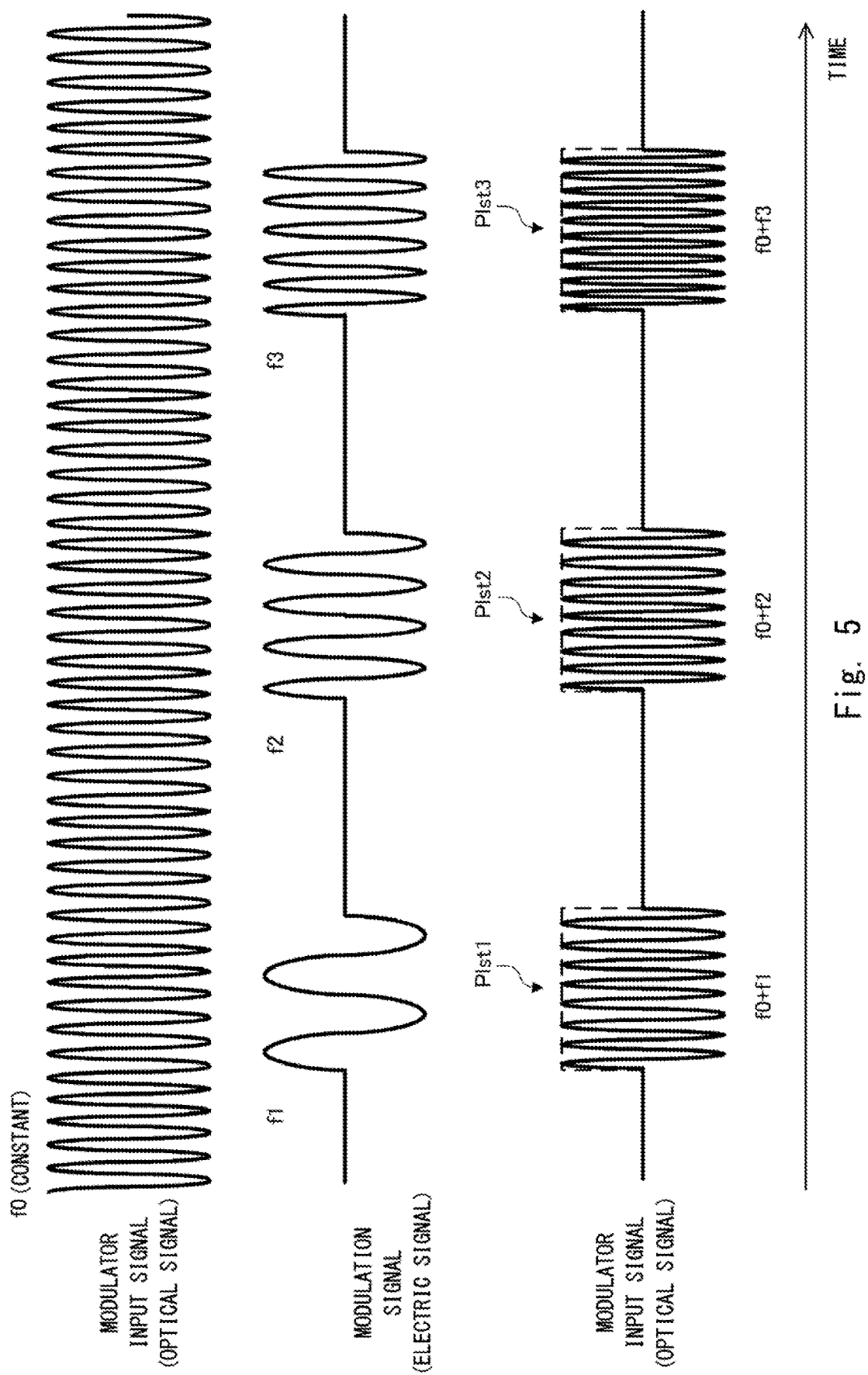
FIG. 5 is a diagram for explaining operations performed by an optical modulator according to the first example embodiment.

The modulation signal generation unit 104 generates a modulation signal, which is used to generate transmission pulses, according to the frequency offset information received from the frequency offset generator 102. Note that as shown in FIG. 5 (which will be described later), the modulation signal is an electric signal having a waveform corresponding to the frequency offsets f1, f2, . . . , fn. The modulation signal generation unit 104 outputs the generated modulation signal to the optical modulator 106.

Further, the modulation signal generation unit 104 outputs a measurement start trigger Trgt to the distance calculation unit 160 at a timing at which each of transmission pulses corresponding to the frequency offsets f1, f2, . . . , fn are transmitted. Note that the measurement start trigger Trgt indicates the transmitting timing of each of the transmission pulses having the respective frequency offsets. Specifically, the modulation signal generation unit 104 outputs a measurement start trigger Trgt1 to the distance calculation unit 160-1 at a timing at which a modulation signal corresponding to the frequency offset f1 is output. Further, the modulation signal generation unit 104 outputs a measurement start trigger Trgt2 to the distance calculation unit 160-2 at a timing at which a modulation signal corresponding to the frequency offset f2 is output. Similarly and subsequently, the modulation signal generation unit 104 outputs a measurement start trigger Trgtn to the distance calculation unit 160-$n$ at a timing at which a modulation signal corresponding to the frequency offset fn is output.

The light source 108 generates an optical signal having a reference frequency f0 as shown in FIG. 5 (which will be described later). The optical signal is input to the optical modulator 106 and the optical interference-system unit 130. The optical modulator 106 generates a plurality of transmission pulses having frequency offsets f1, f2, . . . , fn different from each other by using the modulation signal received from the modulation signal generation unit 104 and the optical signal (a modulator input signal) received from the light source 108. The optical modulator 106 outputs an optical signal including the generated transmission pulses to the optical transmission unit 120.

For example, the optical modulator 106 is an AO modulator (Acousto-Optic modulator). The optical modulator 106 modulates the optical signal (the modulator input signal) by using the modulation signal. In this way, the optical modulator 106 generates a plurality of transmission pulses having frequency offsets different from each other.

FIG. 5 is a diagram for explaining operations performed by the optical modulator 106 according to the first example embodiment. FIG. 5 shows an example in which n is three (n=3), i.e., the number of frequency offsets is three. As shown in FIG. 5, the optical signal (the modulator input signal) input to the optical modulator 106 is an optical signal having a constant frequency f0. Further, the modulation signal has a pulse-like waveform having a frequency f1, a pulse-like waveform having a frequency f2, and a pulse-like waveform having a frequency f3. Note that the amplitude of the modulation signal is 0V except for these pulse-like waveforms. Each of the waveforms is a sine wave having a width Tw.

Note that the optical modulator 106 modulates the optical signal according to the pulse-like waveform of the modulation signal, and outputs the modulated optical signal (a modulator output signal). This modulator output signal corresponds to the transmission pulse. When the optical modulator 106 receives a modulation signal having a pulse-like waveform having the frequency f1, it modulates the optical signal having the frequency f0 so as to f1-shift the optical signal, and outputs a pulse having a frequency f0+f1. This pulse corresponds to the transmission pulse Plst1. Further, when the optical modulator 106 receives a modulation signal having a pulse-like waveform having the frequency f2, it modulates the optical signal having the frequency f0 so as to f2-shift the optical signal, and outputs a pulse having a frequency (f0+f2). This pulse corresponds to the transmission pulse Plst2. Further, when the optical modulator 106 receives a modulation signal having a pulse-like waveform having the frequency f3, it modulates the optical signal having the frequency f0 so as to f3-shift the optical signal, and outputs a pulse having a frequency (f0+f3). This pulse corresponds to the transmission pulse Plst3. Therefore, the transmission pulse indicates a signal of which the optical strength changes in a pulse-like manner. In this way, the transmission pulses Plst1, Plst2 and Plst3 have frequency offsets f1, f2 and f3, respectively, different from each other. Note that broken lines in the modulator output signal indicates the optical strength (the envelope).

Note that the modulation signal generation unit 104 may output the measurement start trigger Trgt1 to the distance calculation unit 160-1 at a timing at which the modulation signal having the pulse-like waveform having the frequency f1 is output. The modulation signal generation unit 104 may output the measurement start trigger Trgt2 to the distance calculation unit 160-2 at a timing at which the modulation signal having the pulse-like waveform having the frequency f2 is output. The modulation signal generation unit 104 may output the measurement start trigger Trgt3 to the distance calculation unit 160-3 at a timing at which the modulation signal having the pulse-like waveform having the frequency f3 is output.

The optical transmission unit 120 transmits (emits) an optical signal including a plurality of transmission pulses to a distance-measurement-target object 90. The transmission pulses are reflected on the distance-measurement-target object 90 and travel toward the distance-measurement apparatus 100. The optical reception unit 122 receives an optical signal including a plurality of reflected pulses reflected on the distance-measurement-target object 90. Note that the frequencies of the plurality of received reflected pulses are frequencies f0+f1, f0+f2, . . . , and f0+fn. Note that the plurality of transmission pulses do not necessarily have to be applied to the same distance-measurement-target object 90. Therefore, the flight time for a round trip of the transmission pulse Plst1 and that of the transmission pulse Plst2 may be different from each other.

The optical interference-system unit 130 detects a frequency offset of the reflected pulse (the received light) by using an optical signal having the frequency f0 received from the light source 108 as reference light. Specifically, the optical interference-system unit 130 makes the reference light received from the light source 108 interfere with the received light and detects their beat frequency. In this way, the optical interference-system unit 130 detects the frequency offset of the reflected pulse. For example, the optical interference-system unit 130 may be a mixer using an optical coupler. Alternatively, the optical interference-system unit 130 may be, for example, a 90-degree hybrid circuit that makes the received light interfere with reference light, i.e., with reference light having two phases of 0 degrees and 90 degrees. The optical interference unit 130 outputs an optical signal having the frequencies f1, f2, . . . , fn corresponding to the frequency offsets to the optical/electrical conversion unit 132.

The optical/electrical conversion unit 132 converts the optical signal received from the optical interference-system unit 130 into an electric signal. The optical/electrical conversion unit 132 may be, for example, an optical/electrical converter using a photodetector or a balanced optical receiver using two photodetectors. The AD converter 134 converts the electric signal, which is an analog signal converted by the optical/electrical conversion unit 132, into a digital signal. The electric signal indicating the frequencies f1, f2, . . . , fn, which has been obtained as the AD converter 134 has converted the analog signal into the digital signal, is output to the bandpass filters 140-1 to 140-n.

The bandpass filter 140 (Band Pass Filter; BPF) uses a frequency corresponding to the frequency offset as its center frequency. The center frequencies of the bandpass filters 140-1 to 140-n are the frequencies f1 to fn, respectively. Therefore, the bandpass filters 140-1 to 140-n let electric signals indicating the frequencies f1 to fn, respectively, pass therethrough. Therefore, the bandpass filter 140 has a function as separation means for separating the optical signal for each of the frequency offsets of the reflected pulses detected by the optical interference unit 130 (the detection unit 8).

The timing extraction unit 150 functions as timing extraction means for extracting the receiving timing of the received reflected pulse. The timing extraction units 150-1 to 150-n extract the receiving timings of the reflected pulses having the frequency offsets f1 to fn, respectively. Then, the timing extraction units 150-1 to 150-n output measurement stop triggers Trgr1 to Trgrn to the distance calculation units 160-1 to 160-n at the receiving timings of the reflected pulses having the frequency offsets f1 to fn, respectively. That is, the measurement stop triggers Trgr indicate the receiving timings of the reflected pulses having the frequency offsets f1 to fn, respectively.

The distance calculation unit 160 calculates a distance R to the distance-measurement-target object 90, by using the Expression 1, from the time difference between the output timing of the measurement start trigger Trgt (a first trigger signal) and the output timing of the measurement stop trigger Trgr (a second trigger signal). Note that the distance calculation unit 160-1 calculates a distance R related to the transmission pulse having the frequency offset f1 from the time difference between the output timing of the measurement start trigger Trgt1 and the output timing of the measurement stop trigger Trgr1. The distance calculation unit 160-2 calculates a distance R related to the transmission pulse having the frequency offset f2 from the time difference between the output timing of the measurement start trigger Trgt2 and the output timing of the measurement stop trigger Trgr2. Similarly and subsequently, the distance calculation unit 160-n calculates a distance R related to a transmission pulse having a frequency offset fn from the time difference between the output timing of a measurement start trigger Trgtn and the output timing of a measurement stop trigger Trgrn.

Note that the plurality of frequency offsets may be predetermined frequencies at equal intervals, such as f1=+100 MHz, f2=+200 MHz, and f3=+300 MHz. However, in some cases, for example, a frequency offset of +200 MHz cannot be used in order to avoid the deterioration of the characteristic of a certain frequency due to the characteristics of the distance-measurement apparatus 100 or the like. In such a case, the frequency offsets may be predetermined frequencies that are not equally spaced, such as f1=+100 MHz, f2=+350 MHz, and f3=+270 MHz.

Figure 6:
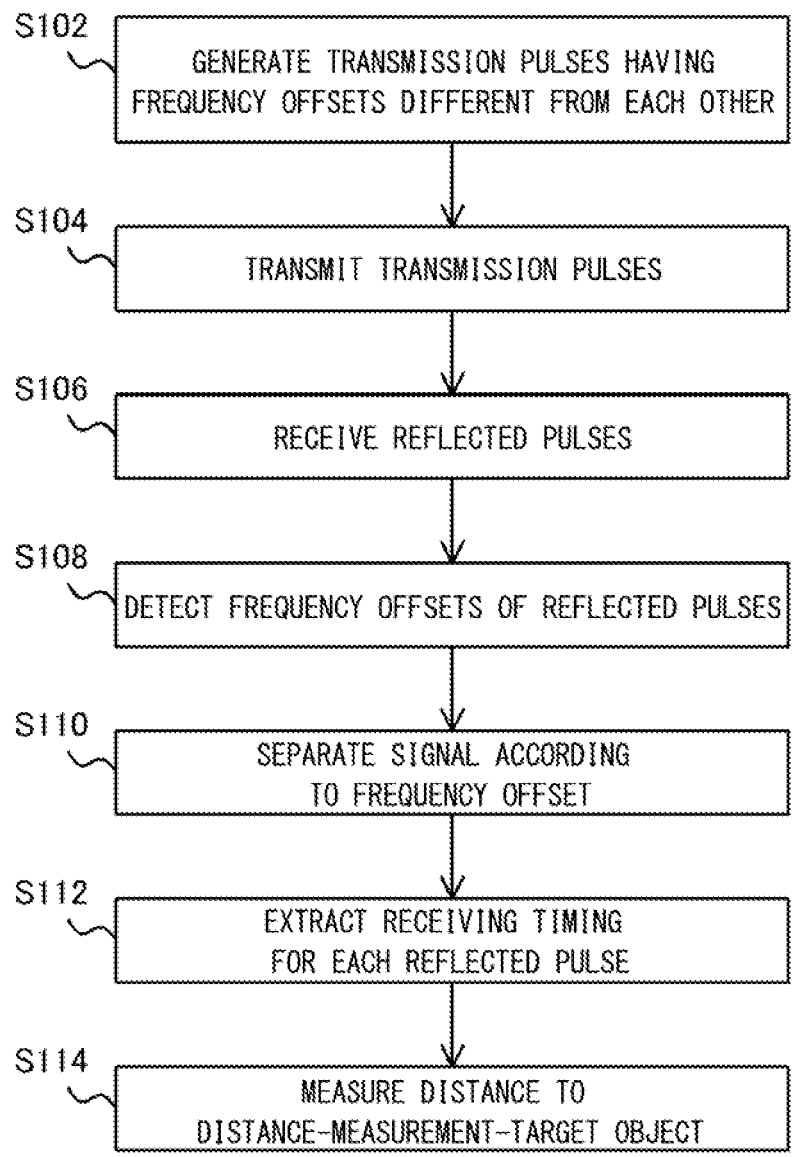
FIG. 6 is a flowchart showing a distance-measurement method performed by a distance-measurement apparatus according to the first example embodiment.

FIG. 6 is a flowchart showing a distance-measurement method performed by the distance-measurement apparatus 100 according to the first example embodiment. As described above, the pulse generation unit 110 generates transmission pulses having frequency offsets different from each other (step S102). The optical transmission unit 120 transmits (emits) an optical signal including the transmission pulses generated in the process in the step S102 to the distance-measurement-target object 90 (step S104). Specifically, the optical modulator 106 of the pulse generation unit 110 modulates the optical signal (the modulator input signal) by using a modulation signal generated by the modulation signal generation unit 104. In this way, the optical modulator 106 generates a plurality of transmission pulses having frequency offsets different from each other. Further, by this process, the frequency offsets different from each other are applied to the respective transmission pulses. Note that, at the timing of the step S104, the measurement start triggers Trgt corresponding to the respective transmission pulses can be output to the distance calculation unit 160.

The optical reception unit 122 receives an optical signal including reflected pulses (step S106). As described above, the optical interference-system unit 130 detects the frequency offset of each reflected pulse by using the reference light (step S108). The bandpass filter 140 (the separation means) separates the optical signal for each of the frequency offsets as described above (step S110). In this way, the optical signal is separated for each of reflected pulses.

As described above, the timing extraction unit 150 extracts the receiving timing of each of the separated reflected pulses, and outputs a measurement stop trigger Trgr at the extracted receiving timing (step S112). The distance calculation unit 160 calculates a distance R to the distance-measurement-target object 90 by using the measurement start trigger Trgt and the measurement stop trigger Trgr as described above (step S114).

Comparison with Comparative Example

Next, the first example embodiment and a comparative example will be described by using timing charts.

Figure 7:
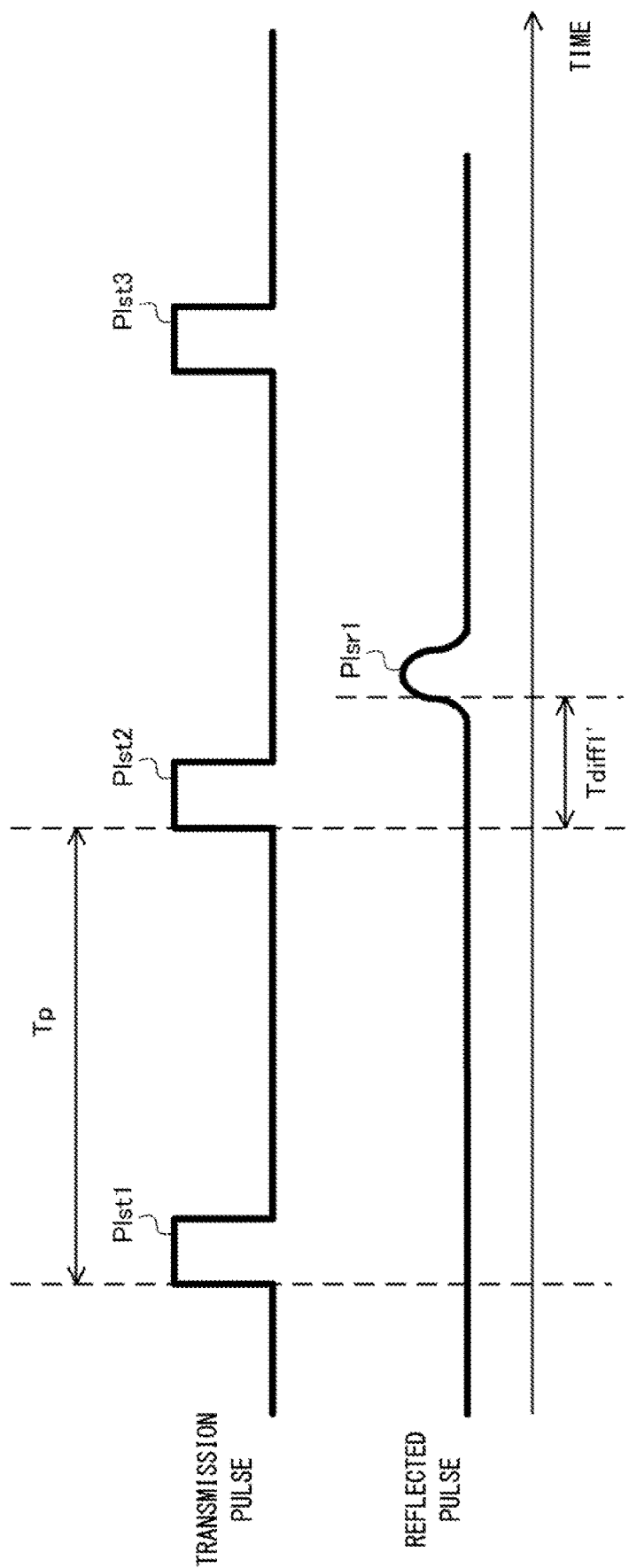
FIG. 7 is a timing chart showing a relation between transmission pulses and reflected pulses according to a comparative example.
Figure 8:
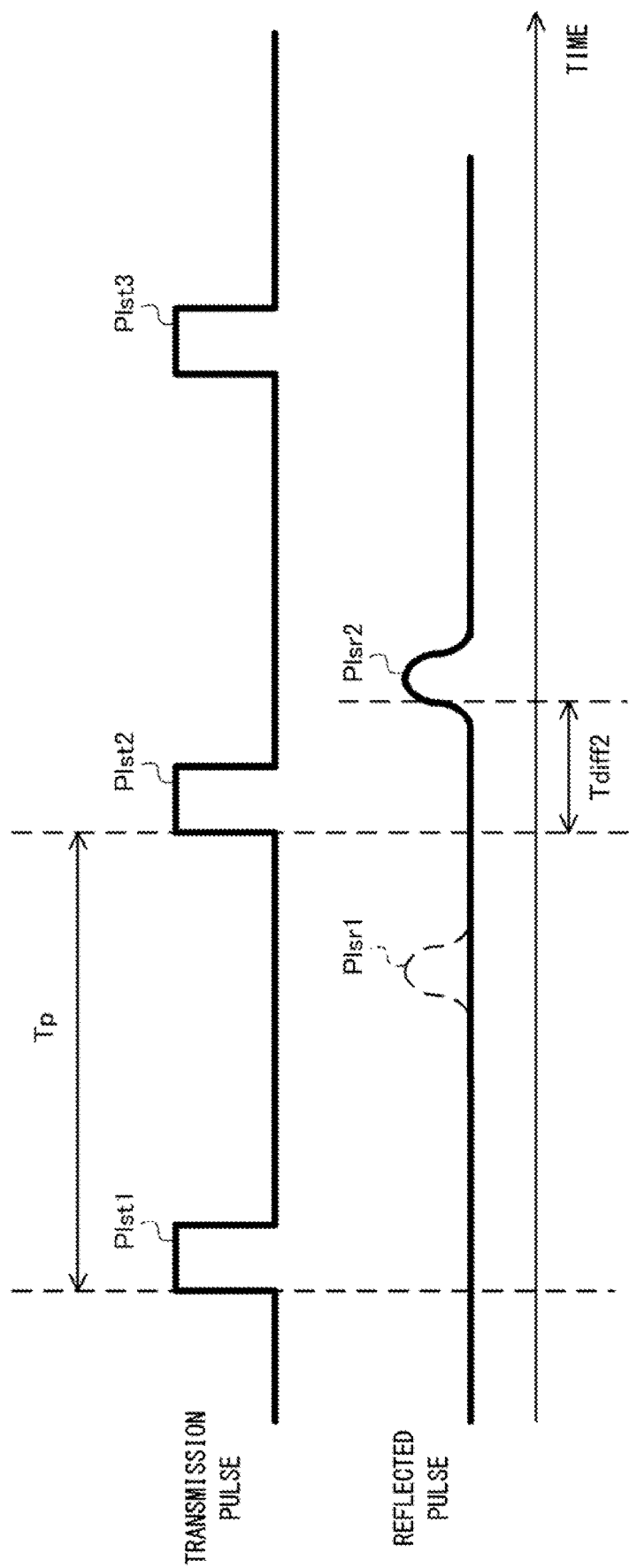
FIG. 8 is a timing chart showing a relation between transmission pulses and reflected pulses according to a comparative example.

FIGS. 7 and 8 are timing charts showing a relation between transmission pulses and reflected pulses according to the comparative example. In the example shown in FIGS. 7 and 8, it is assumed that transmission pulses Plst1, Plst2 and Plst3 are transmitted at a pulse period Tp. Further, it is assumed that the transmission pulses Plst1, Plst2 and Plst3 have the same frequency. Further, in the example shown in FIG. 7, it is assumed that the flight time until a transmission pulse is reflected on the distance-measurement-target object 90 and returned is longer than the pulse period Tp.

Firstly, the transmission pulse Plst1 is transmitted. After that and after the transmission pulse Plst2 is transmitted, a reflected pulse Plsr1, which is the transmission pulse Plst1 that has been reflected on the distance-measurement-target object 90 and returned, is received. At this point, in the comparative example shown in FIG. 7, there is a possibility that a distance is measured by using a time difference Tdiff1' between the transmitting timing of the transmission pulse Plst2 and the receiving timing of the reflected pulse Plsr1. When a distance is measured by using the time difference Tdiff1' as described above, the distance is incorrectly calculated.

In contrast, in the example shown in FIG. 8, it is assumed that the flight time until a transmission pulse is reflected on the distance-measurement-target object 90 and returned is shorter than the pulse period Tp. Further, it is assumed that the transmission pulse Plst1 is not reflected, so that no reflected pulse Plsr1 of the transmission pulse Plst1 is received. Further, it is assumed that the transmission pulse Plst2 is reflected on the distance-measurement-target object and its reflected pulse Plsr2 is received. In this case, the distance is measured by using a time difference Tdiff2 between the transmitting timing of the transmission pulse Plst2 and the receiving timing of the reflected pulse Plsr2. Although this distance measurement process is correct, it cannot be distinguished from the process shown in FIG. 7.

In order to cope with the problem shown in FIGS. 7 and 8, it is conceivable to increase the pulse period when it is presumed that the distance to the distance-measurement-target object is long. In this way, it is possible to prevent the incorrect measurement of a distance like the one shown in FIG. 7. However, if the pulse period is increased, the length of time from a time at which a distance is measured to a time at which the next distance is measured is increased, so that the speed of the distance measurement may decrease. Therefore, since distances cannot be measured at a desired speed, the distance measurement cannot be performed properly. In contrast to this, the distance-measurement apparatus 100 according to the first example embodiment can measure distances without increasing the pulse period.

Figure 9:
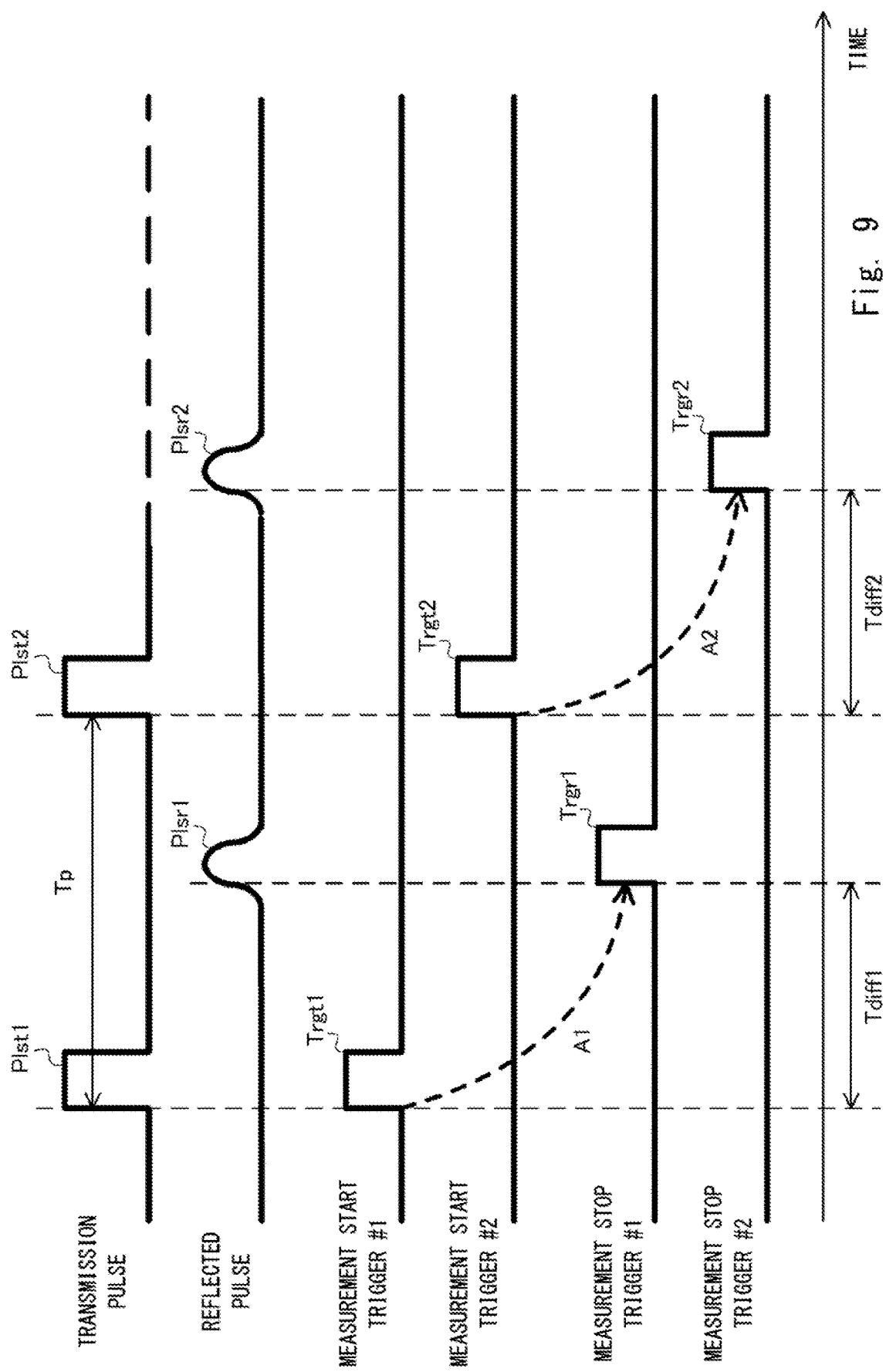
FIG. 9 is a timing chart showing a relation between transmission pulses and reflected pulses according to the first example embodiment.

FIG. 9 is a timing chart showing a relation between transmission pulses and reflected pulses according to the first example embodiment. In the example shown in FIG. 9, it is assumed that transmission pulses Plst1 and Plst2 are transmitted at a pulse period Tp. Further, in the example shown in FIG. 9, it is assumed that the flight time until a transmission pulse is reflected on the distance-measurement-target object 90 and returned is shorter than the pulse period Tp.

Firstly, a transmission pulse Plst1 having the frequency offset f1 is transmitted. At this transmitting timing, a measurement start trigger Trgt1 is also output to the distance calculation unit 160-1. After that, a reflected pulse Plsr1 having the frequency offset f1 is received before a transmission pulse Plst2 is transmitted. At this receiving timing, the frequency offset f1 is detected, and the reflected pulse Plsr1 is separated by the band-pass filter 140-1. Further, a measurement stop trigger Trgr1 is output from the timing extraction unit 150-1 to the distance calculation unit 160-1. Note that the transmitted optical signal is attenuated due to the reflection on the distance-measurement-target object 90 and through the flight process of the optical signal. As a result, the waveform of the envelop of the reflected pulse Plsr1 is blunted as compared to the waveform of the envelop of the transmission pulse Plst1. Therefore, the timing extraction unit 150-1 outputs the measurement stop trigger Trgr1 at a timing at which the optical strength of the reflected pulse Plsr1 exceeds a predetermined threshold. The same applies to the other reflected pulses such as a reflected pulse Plsr2.

At this point, the reflected pulse Plsr1 having the frequency offset f1 is associated with the transmission pulse Plst1 having the frequency offset f1 by the distance calculation unit 160-1. Therefore, as shown by a broken-line arrow A1, the measurement stop trigger Trgr1 indicating the receiving timing of the reflected pulse Plsr1 is associated with the measurement start trigger Trgt1 indicating the transmitting timing of the transmission pulse Plst1 by the distance calculation unit 160-1. In this way, the distance calculation unit 160-1 calculates a distance to the distance-measurement-target object 90 from a time difference Tdiff1 between the measurement start trigger Trgt1 and the measurement stop trigger Trgr1. Therefore, the distance calculation unit 160-1 can properly calculate the distance to the distance-measurement-target object 90, on which the transmission pulse Plst1 has been reflected.

Similarly, a transmission pulse Plst2 having the frequency offset f2 is transmitted. At this transmitting timing, a measurement start trigger Trgt2 is also output to the distance calculation unit 160-2. After that, a reflected pulse Plsr2 having the frequency offset f2 is received before a transmission pulse Plst3 (not shown) is transmitted. At this receiving timing, the frequency offset f2 is detected, and the reflected pulse Plsr2 is separated by the band-pass filter 140-2. Further, a measurement stop trigger Trgr2 is output from the timing extraction unit 150-2 to the distance calculation unit 160-2.

At this point, the reflected pulse Plsr2 having the frequency offset f2 is associated with the transmission pulse Plst2 having the frequency offset f2 by the distance calculation unit 160-2. Therefore, as shown by a broken-line arrow A2, the measurement stop trigger Trgr2 indicating the receiving timing of the reflected pulse Plsr2 is associated with the measurement start trigger Trgt2 indicating the transmitting timing of the transmission pulse Plst2 by the distance calculation unit 160-2. In this way, the distance calculation unit 160-2 calculates a distance to the distance-measurement-target object 90 from a time difference Tdiff2 between the measurement start trigger Trgt2 and the measurement stop trigger Trgr2. Therefore, the distance calculation unit 160-2 can properly calculate the distance to the distance-measurement-target object 90, on which the transmission pulse Plst2 has been reflected.

Figure 10:
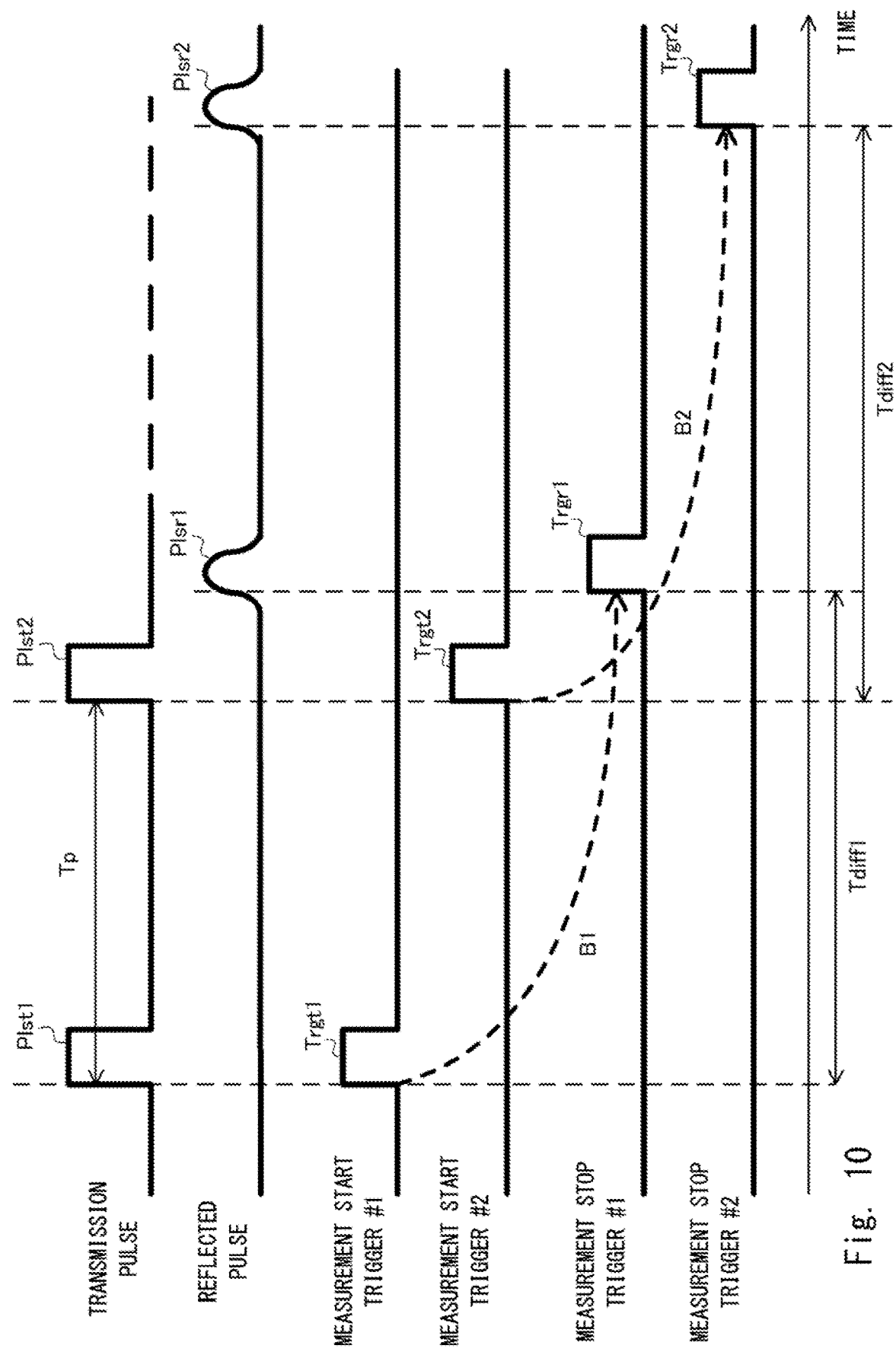
FIG. 10 is a timing chart showing a relation between transmission pulses and reflected pulses according to the first example embodiment.

FIG. 10 is a timing chart showing a relation between transmission pulses and reflected pulses according to the first example embodiment. In the example shown in FIG. 10, it is assumed that the transmission pulses Plst1 and Plst2 are transmitted at a pulse period Tp. Further, in the example shown in FIG. 10, it is assumed that the flight time until a transmission pulse is reflected on the distance-measurement-target object 90 and returned is longer than the pulse period Tp.

Firstly, a transmission pulse Plst1 having the frequency offset f1 is transmitted. At this transmitting timing, a measurement start trigger Trgt1 is also output to the distance calculation unit 160-1. After that, a reflected pulse Plsr1 having the frequency offset f1 is received after a transmission pulse Plst2 is transmitted. At this receiving timing, the frequency offset f1 is detected, and the reflected pulse Plsr1 is separated by the band-pass filter 140-1. Further, a measurement stop trigger Trgr1 is output from the timing extraction unit 150-1 to the distance calculation unit 160-1.

At this point, the reflected pulse Plsr1 having the frequency offset f1 is associated with the transmission pulse Plst1 having the frequency offset f1 by the distance calculation unit 160-1. Therefore, as shown by a broken-line arrow B1, the measurement stop trigger Trgr1 indicating the receiving timing of the reflected pulse Plsr1 is associated with the measurement start trigger Trgt1 indicating the transmitting timing of the transmission pulse Plst1 by the distance calculation unit 160-1. In this way, the distance calculation unit 160-1 calculates a distance to the distance-measurement-target object 90 from a time difference Tdiff1 between the measurement start trigger Trgt1 and the measurement stop trigger Trgr1. Therefore, even when the flight time of the optical signal is longer than the pulse period, the distance calculation unit 160-1 can properly calculate the distance to the distance-measurement-target object 90, on which the transmission pulse Plst1 has been reflected.

Similarly, a transmission pulse Plst2 having the frequency offset f2 is transmitted. At this transmitting timing, a measurement start trigger Trgt2 is also output to the distance calculation unit 160-2. After that, a reflected pulse Plsr2 having the frequency offset f2 is received after a transmission pulse Plst3 (not shown) is transmitted. At this receiving timing, the frequency offset f2 is detected, and the reflected pulse Plsr2 is separated by the band-pass filter 140-2. Further, a measurement stop trigger Trgr2 is output from the timing extraction unit 150-2 to the distance calculation unit 160-2.

At this point, the reflected pulse Plsr2 having the frequency offset f2 is associated with the transmission pulse Plst2 having the frequency offset f2 by the distance calculation unit 160-2. Therefore, as shown by a broken-line arrow B2, the measurement stop trigger Trgr2 indicating the receiving timing of the reflected pulse Plsr2 is associated with the measurement start trigger Trgt2 indicating the transmitting timing of the transmission pulse Plst2 by the distance calculation unit 160-2. In this way, the distance calculation unit 160-2 calculates a distance to the distance-measurement-target object 90 from a time difference Tdiff2 between the measurement start trigger Trgt2 and the measurement stop trigger Trgr2. Therefore, even when the flight time of the optical signal is longer than the pulse period, the distance calculation unit 160-2 can properly calculate the distance to the distance-measurement-target object 90, on which the transmission pulse Plst2 has been reflected.

Figure 11:
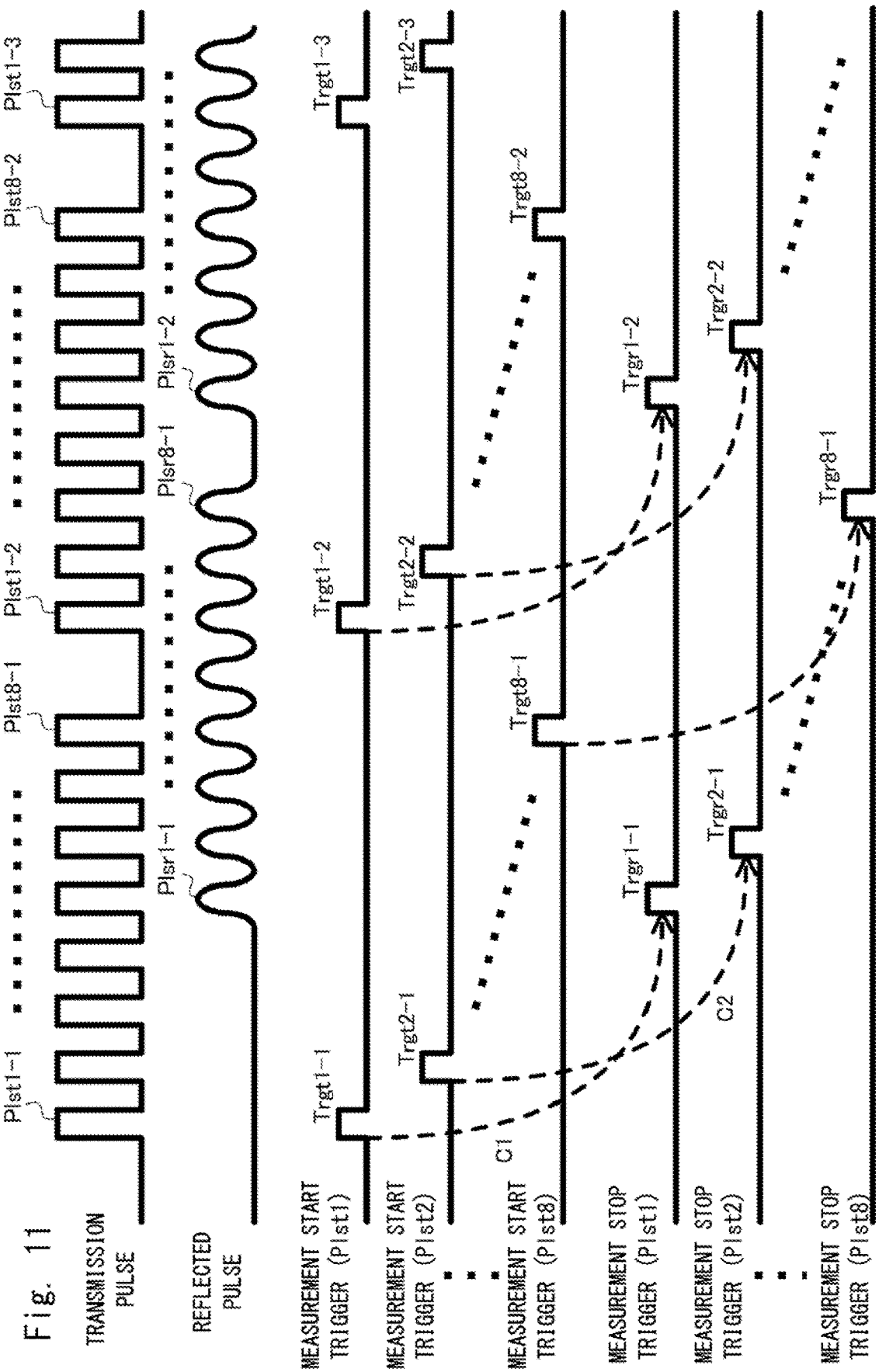
FIG. 11 is a timing chart showing a relation between transmission pulses and reflected pulses according to the first example embodiment.

FIG. 11 is a timing chart showing a relation between transmission pulses and reflected pulses according to the first example embodiment. In the example shown in FIG. 11, it is assumed that transmission pulses Plst1, Plst2, Plst3, Plst4, Plst5, Plst6, Plst7 and Plst8 are transmitted at a pulse period that is much shorter than the flight time until a transmission pulse is reflected on the distance-measurement-target object 90 and returned. That is, it is assumed that the number of bandpass filters 140, that of timing extraction units 150, and that of distance calculation units 160 are all eight (n=8). Further, the transmission pulses Plst1, Plst2, Plst3, Plst4, Plst5, Plst6, Plst7 and Plst8 have frequency offsets f1, f2, f3, f4, f5, f6, f7 and f8, respectively. That is, it is assumed that the number of frequency offsets is also eight.

Note that after transmission pulses Plst1-1 to Plst8-1 are transmitted, transmission pulses Plst1-2 to Plst8-2 are transmitted. Similarly, after the transmission pulses Plst1-2 to Plst8-2 are transmitted, transmission pulses Plst1-3 to Plst8-3 are transmitted. Further, all of the transmission pulses Plst1-1, Plst1-2 and Plst1-3 have the same frequency offset f1. Similarly, all of the transmission pulses Plst2-1, Plst2-2 and Plst2-3 have the same frequency offset f2. The same applies to the other transmission pulses.

Firstly, a transmission pulse Plst1-1 having the frequency offset f1 is transmitted. At this transmitting timing, a measurement start trigger Trgt1-1 is also output to the distance calculation unit 160-1. After that, a reflected pulse Plsr1-1 having the frequency offset f1 is received after at least the transmission pulse Plst2-1 is transmitted. At this receiving timing, the frequency offset f1 is detected, and the reflected pulse Plsr1-1 is separated by the bandpass filter 140-1. Further, a measurement stop trigger Trgr1-1 is output from the timing extraction unit 150-1 to the distance calculation unit 160-1.

At this point, the reflected pulse Plsr1-1 having the frequency offset f1 is associated with the transmission pulse Plst1-1 having the frequency offset f1 by the distance calculation unit 160-1. Therefore, as shown by a broken-line arrow C1, the measurement stop trigger Trgr1-1 is associated with the measurement start trigger Trgt1-1 by the distance calculation unit 160-1. In this way, the distance calculation unit 160-1 calculates a distance to the distance-measurement-target object 90 from a time difference between the measurement start trigger Trgt1-1 and the measurement stop trigger Trgr1-1. Therefore, even when the flight time of the optical signal is much longer than the pulse period, the distance calculation unit 160-1 can properly calculate the distance to the distance-measurement-target object 90, on which the transmission pulse Plst1-1 has been reflected.

Similarly, a transmission pulse Plst2-1 having the frequency offset f2 is transmitted. At this transmitting timing, a measurement start trigger Trgt2-1 is also output to the distance calculation unit 160-2. After that, a reflected pulse Plsr2-1 having the frequency offset f2 is received after at least the transmission pulse Plst3-1 is transmitted. At this receiving timing, the frequency offset f2 is detected, and the reflected pulse Plsr2-1 is separated by the bandpass filter 140-2. Further, a measurement stop trigger Trgr2-1 is output from the timing extraction unit 150-2 to the distance calculation unit 160-2.

At this point, the reflected pulse Plsr2-1 having the frequency offset f2 is associated with the transmission pulse Plst2-1 having the frequency offset f2 by the distance calculation unit 160-2. Therefore, as shown by a broken-line arrow C2, the measurement stop trigger Trgr2-1 is associated with the measurement start trigger Trgt2-1 by the distance calculation unit 160-2. In this way, the distance calculation unit 160-2 calculates a distance to the distance-measurement-target object 90 from a time difference between the measurement start trigger Trgt2-1 and the measurement stop trigger Trgr2-1. Therefore, even when the flight time of the optical signal is much longer than the pulse period, the distance calculation unit 160-2 can properly calculate the distance to the distance-measurement-target object 90, on which the transmission pulse Plst2-1 has been reflected. Similarly and subsequently, the distance calculation units 160-3 to 160-8 calculate the distance to the distance-measurement-target object 90 from time differences between the measurement start triggers Trgt3-1 to Trgt8-1 and measurement stop triggers Trgr3-1 to Trgr8-1, respectively.

As described above, even when transmission pulses are successively applied to the distance-measurement-target object 90 at a considerably short period, the reflected pulses can be distinguished from one another in the receiving-side module, so that it is possible to properly measure the distance to the distance-measurement-target object 90. Further, since it is possible to successively apply transmission pulses to the distance-measurement-target object 90 at a considerably short period, it is possible to increase the number of times of distance measurements in a unit time.

Further, it is possible to improve the accuracy of the distance measurement by repeatedly applying a transmission pulse to the same distance-measurement-target object 90 and thereby repeatedly measuring the distance thereto, and averaging the results of the measurements. That is, the distance to the same distance-measurement-target object 90 is measured eight times by applying transmission pulses Plst1-1 to Plst8-1 to the distance-measurement-target object 90 and using reflected pulses Plsr1-1 to Plsr8-1 thereof. Further, the accuracy of the distance measurement is improved by averaging the results of the eight distance measurements. Therefore, the distance-measurement apparatus 100 according to the first example embodiment can improve the accuracy of the above-described averaging process in a short time by successively applying transmission pulses to the same distance-measurement-target object 90 at a considerably short period.

As described above, the distance calculation unit 160 according to the first example embodiment calculates the distance R by associating a measurement start trigger signal related to a transmission pulse having a certain frequency offset with a measurement stop trigger signal related to a reflected pulse having this frequency offset. In other words, a transmission pulse and a reflected pulse having frequency offsets corresponding to each other are associated with each other by the distance calculation unit 160. In this way, the distance-measurement apparatus 100 according to the first example embodiment can properly associate a transmission pulse with a reflected pulse, which is reflected light of that transmission pulse reflected on a distance-measurement-target object 90. Therefore, it is possible to properly measure a distance to a distance-measurement-target object irrespective of the distance thereto or the transmission period of transmission pulses.

Further, the distance-measurement apparatus 100 according to the first example embodiment is configured to separate a received optical signal for each of the frequency offsets of the reflected pulses by using the bandpass filter 140 (the separation means). Since the separation of an optical signal using the bandpass filter 140 can be performed by hardware, it can be performed at a high speed as compared to the processing performed by software. Further, by the separation using the bandpass filters 140, it is possible to perform parallel processing on a frequency offset basis. That is, the distance calculation unit 160 can calculate a distance R for each separated signal. Therefore, the distance-measurement apparatus 100 according to the first example embodiment can perform the distance-measurement processing at a high speed. Further, by separating a received signal for each of the frequency offsets of the reflected pulses, it is possible to easily extract the receiving timing of each reflected pulse.

Note that the distance-measurement apparatus 100 according to the first example embodiment applies frequency offsets different from each other to repeatedly-transmitted transmission pulses in order to associate the transmission pulses with reflected pulses which are reflected light of the transmission pulses reflected on the distance-measurement-target object 90. That is, it can be said that the distance-measurement apparatus 100 according to the first example embodiment marks a transmission pulse in order to distinguish the reflected pulse corresponding to the transmission pulse from those corresponding to other transmission pulses. Note that as a method for marking a transmission pulse, it is conceivable to change the amplitude of each transmission pulse. However, depending on the distance to the distance-measurement-target object 90 or the like, the degree of the attenuation of the signal (the pulse) may change. Therefore, it is difficult to distinguish reflected pulses from one another by using the amplitude thereof.

Second Example Embodiment

Next, a second example embodiment will be described. The second example embodiment is different from the first example embodiment because the second example embodiment includes a plurality of light sources. Note that components in the second example embodiment that are substantially the same as those in the first example embodiment are denoted by the same reference numerals (or the same symbols). Further, in the following descriptions, descriptions of components that are substantially the same as those in the first example embodiment will be omitted as appropriate.

Figure 12:
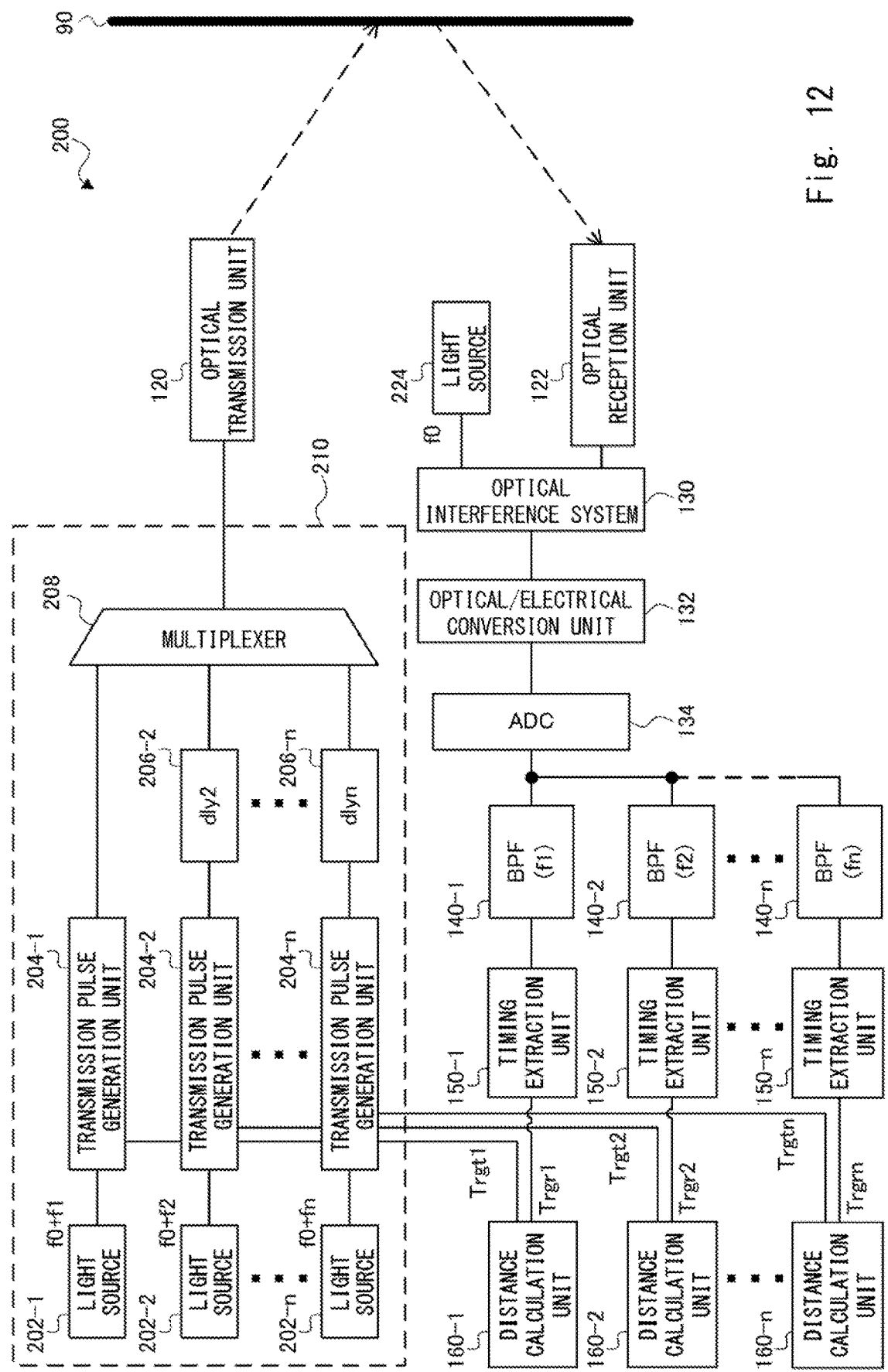
FIG. 12 shows a configuration of a distance-measurement apparatus according to a second example embodiment.

FIG. 12 shows a configuration of a distance-measurement apparatus 200 according to the second example embodiment. The distance-measurement apparatus 200 according to the second example embodiment includes, as a transmitting-side module, light sources 202-1 to 202-n, transmission pulse generation units 204-1 to 204-n, delay units 206-2 to 206-n, a multiplexer 208, and an optical transmission unit 120. The light sources 202, the transmission pulse generation units 204, the delay units 206, and the multiplexer 208 constitute a pulse generation unit 210 that generates a plurality of transmission pulses having frequency offsets different from each other. This pulse generation unit 210 corresponds to the generation unit 2 shown in FIG. 1.

Further, the distance-measurement apparatus 200 according to the second example embodiment includes, as a receiving-side module, an optical reception unit 122, a light source 224, an optical interference-system unit 130, an optical/electrical conversion unit 132, and an AD converter 134. Further, similarly to the first example embodiment, the distance-measurement apparatus 200 according to the second example embodiment includes bandpass filters 140-1 to 140-n, timing extraction units 150-1 to 150-n, and distance calculation units 160-1 to 160-n. That is, the receiving-side module of the distance-measurement apparatus 200 is substantially the same as that of the first example embodiment except that it includes the light source 224.

The light source 202-1 generates an optical signal having a frequency f0+f1, and outputs the generated optical signal to the transmission pulse generation unit 204-1. The light source 202-2 generates an optical signal having a frequency f0+f2, and outputs the generated optical signal to the transmission pulse generation unit 204-2. Similarly and subsequently, the light source 202-n generates an optical signal having a frequency f0+fn, and outputs the generated optical signal to the transmission pulse generation unit 204-n.

Each of the transmission pulse generation units 204 has substantially the same function as those of the modulation signal generation unit 104 and the optical modulator 106 shown in FIG. 4. The transmission pulse generation unit 204-1 generates a transmission pulse Plst1 like the one shown in FIG. 5 by modulating the optical signal having the frequency f0+f1. The transmission pulse generation unit 204-2 generates a transmission pulse Plst2 like the one shown in FIG. 5 by modulating the optical signal having the frequency f0+f2. The transmission pulse generation unit 204-3 generates a transmission pulse Plst3 like the one shown in FIG. 5 by modulating the optical signal having the frequency f0+f3. Similarly and subsequently, a transmission pulse generation unit 204-n generates a transmission pulse Plstn by modulating an optical signal having a frequency f0+fn.

The delay units 206-2 to 206-n delay the transmission pulses Plst2 to Plstn received from the transmission pulse generation units 204-2 to 204-n, respectively, by an amount equivalent to an integer multiple of the pulse period. That is, the delay unit 206-2 delays the transmission pulse Plst2 received from the transmission pulse generation unit 204-2 by a delay Tp. The delay unit 206-3 delays the transmission pulse Plst3 received from the transmission pulse generation unit 204-3 by a delay 2*Tp. That is, a delay unit 206-k (k is an integer no smaller than two and no greater than n) delays a transmission pulse Plstk received from a transmission pulse generation unit 204-k by a delay (k−1)*Tp.

The multiplexer 208 combines (i.e., multiplexes) the transmission pulses Plst1 and the transmission pulses Plst2 to Plstn, which have been delayed by the delay units 206-2 to 206-n, respectively. In this way, the multiplexer 208 generates an optical signal including transmission pulses Plst1 to Plstn arranged at intervals of the pulse period Tp on the time axis as shown in FIG. 5 (i.e., transmission pulses shown in FIGS. 9 to 11). The optical transmission unit 120 transmits (emits) this optical signal to a distance-measurement-target object 90.

Further, the transmission pulse generation unit 204 outputs a measurement start trigger Trgt to the distance calculation unit 160 at timings at which the transmission pulses corresponding to the frequency offsets f1, f2, . . . , fn are output. That is, the transmission pulse generation unit 204-1 outputs a measurement start trigger Trgt1 at a timing at which the transmission pulse Plst1 is generated. Further, the transmission pulse generation unit 204-2 outputs a measurement start trigger Trgt2 at a timing when the delay time applied by the delay unit 206-2 has elapsed after the transmission pulse Plst2 is generated. That is, a transmission pulse generation unit 204-k outputs a measurement start trigger Trgtk at a timing when a delay time applied by a delay unit 206-k has elapsed after a transmission pulse Plstk is generated.

The light source 224 emits an optical signal having a reference frequency f0 as reference light. When the optical reception unit 122 receives a reflected pulse (reflected light), the optical interference-system unit 130 detects a frequency offset of the reflected pulse (the received light) by using the reference light having the frequency f0 received from the light source 224 according to the above-described method. Note that the operations performed by the optical/electrical conversion unit 132, the AD converter 134, the bandpass filters 140, the timing extraction units 150, and the distance calculation units 160 are substantially the same as those performed in the first example embodiment, and therefore descriptions thereof will be omitted.

The distance-measurement apparatus 200 according to the second example embodiment includes the light sources 202-1 to 202-n each of which emits an optical signal in which a frequency offset is set in advance. Even by the above-described configuration, similarly to the first example embodiment, it is possible to properly measure a distance to a distance-measurement-target object 90 irrespective of the distance thereto or the transmission period of the transmission pulse. It should be noted that since the distance-measurement apparatus 200 according to the second example embodiment includes a plurality of light sources 202, its configuration is more complicated than that of the distance-measurement apparatus 100 according to the first example embodiment. That is, the distance-measurement apparatus 200 according to the second example embodiment modulates light emitted from the light source 108, which emits light having the reference frequency f0, into an optical signal having a different frequency for each transmission pulse, and thereby generates a plurality of transmission pulses having frequency offsets different from each other. Therefore, the distance-measurement apparatus 200 according to the second example embodiment, which may have a simplified configuration, can properly measure a distance.

Third Example Embodiment

Next, a third example embodiment will be described. The third example embodiment is different from the other example embodiments because frequency offsets are randomly determined in the third example embodiment. Note that components in the third example embodiment that are substantially the same as those in the first example embodiment are denoted by the same reference numerals (or the same symbols). Further, in the following descriptions, descriptions of components that are substantially the same as those in the first example embodiment will be omitted as appropriate.

Figure 13:
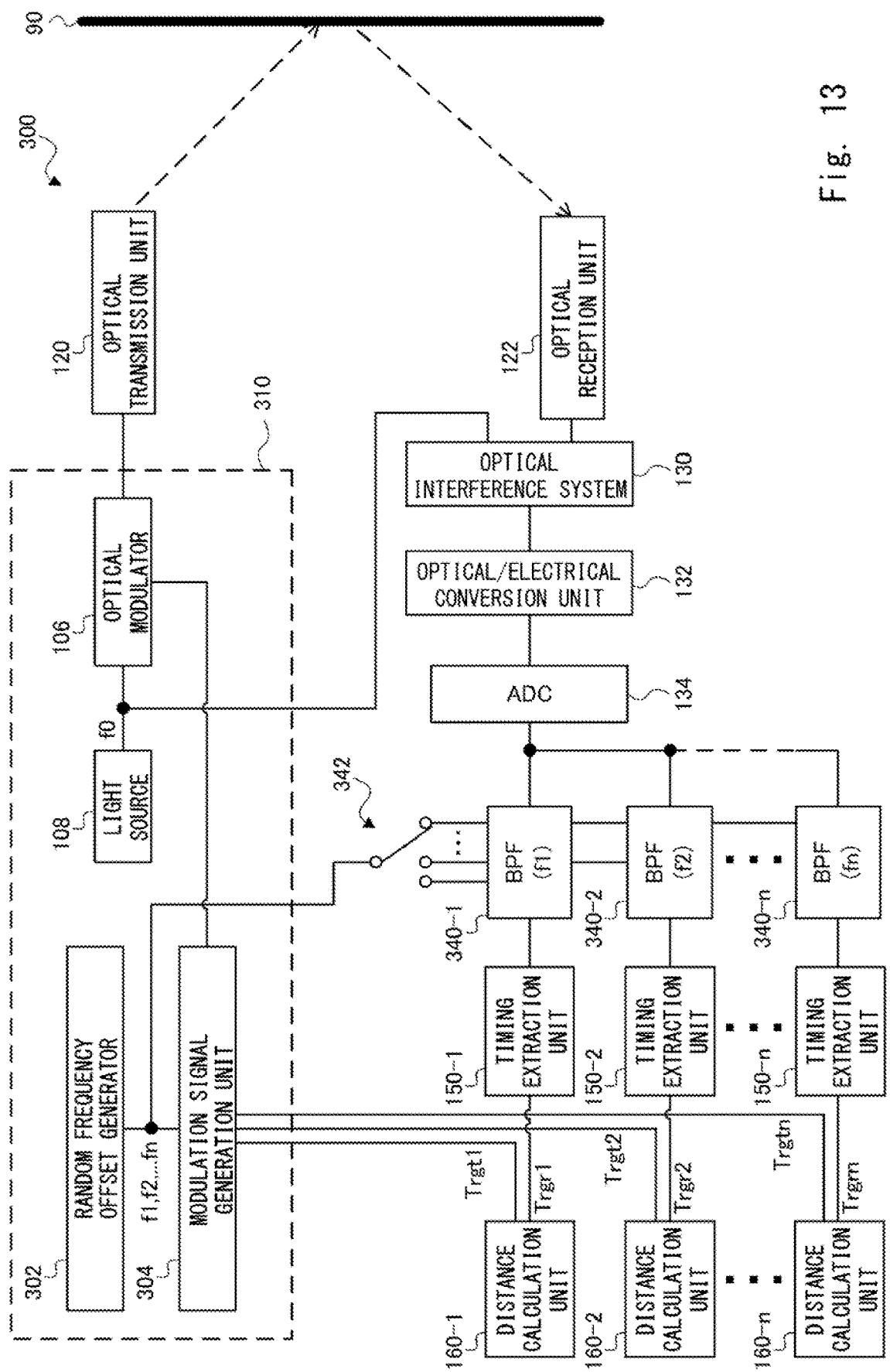
FIG. 13 shows a configuration of a distance-measurement apparatus according to a third example embodiment.

FIG. 13 shows a configuration of a distance-measurement apparatus 300 according to the third example embodiment. The distance-measurement apparatus 300 according to the third example embodiment includes, as a transmitting-side module, a random frequency offset generator 302, a modulation signal generation unit 304, an optical modulator 106, a light source 108, and an optical transmission unit 120. The random frequency offset generator 302, the modulation signal generation unit 304, the optical modulator 106, and the light source 108 constitute a pulse generation unit 310 that generates a plurality of transmission pulses having frequency offsets different from each other. This pulse generation unit 310 corresponds to the generation unit 2 shown in FIG. 1. Note that the operations performed by the optical modulator 106, the light source 108, and the optical transmission unit 120 are substantially the same as those performed in the first example embodiment, and therefore descriptions thereof will be omitted.

Further, the distance-measurement apparatus 300 according to the third example embodiment includes, as a receiving-side module, an optical reception unit 122, an optical interference-system unit 130, an optical/electrical conversion unit 132, and an AD converter 134. Further, the distance-measurement apparatus 300 according to the third example embodiment includes bandpass filters 340-1 to 340-n, a select switch 342, timing extraction units 150-1 to 150-n, and distance calculation units 160-1 to 160-n. Note that the operations performed by the optical reception unit 122, the optical interference unit 130, the optical/electrical conversion unit 132, the AD converter 134, the timing extraction units 150, and the distance calculation units 160 are substantially the same as those performed in the first example embodiment, and therefore descriptions thereof will be omitted.

The random frequency offset generator 302 randomly determines a frequency offset that is applied to each transmission pulse. The random frequency offset generator 302 outputs frequency offset information indicating frequency offsets to the modulation signal generation unit 304. Note that the frequency offset information indicates frequency offsets f1, f2, . . . , fn, respectively. However, in the third example embodiment, the frequency offsets f1, f2, . . . , fn are not constant. For example, assuming that the number of frequency offsets is three (n=3), in some point of time, the frequency offsets f1, f2 and f3 may be +50 MHz, +200 MHz, and +170 MHz, respectively. Further, at another point of time, the frequency offsets f1, f2 and f3 may be +320 MHz, +110 MHz and +210 MHz, respectively.

The modulation signal generation unit 304 generates a modulation signal, which is used to generate transmission pulses, according to the frequency offset information received from the random frequency offset generator 302. In this way, the pulse generation unit 310 generates a plurality of transmission pulses having random frequency offsets different from each other in a method substantially the same as that according to the first example embodiment. Note that, as described above, since the frequency offsets f1, f2, . . . , fn are not constant, the modulation signal generated by the modulation signal generation unit 304 is also not constant. Further, the modulation signal generation unit 304 outputs measurement start triggers Trgt1 to Trgtn to the distance calculation unit 160 at respective timings at which transmission pulses corresponding to the frequency offsets f1, f2, . . . , fn, respectively, are transmitted.

Further, the random frequency offset generator 302 outputs the frequency offset information to the corresponding bandpass filter 340 through the select switch 342. The select switch 342 switches the bandpass filter 340 to which frequency offset information is output according to the frequency offset information. Upon receiving the frequency offset information, the bandpass filter 340 changes its center frequency to a frequency corresponding to the frequency offset indicated in the frequency offset information.

Specifically, when the random frequency offset generator 302 generates frequency offset information indicating the frequency offset f1, it controls the select switch 342 so that it is connected to the bandpass filter 340-1. When the random frequency offset generator 302 is connected to the bandpass filter 340-1 through the select switch 342, it outputs the frequency offset information indicating the frequency offset f1 to the bandpass filter 340-1. Then, the bandpass filter 340-1 changes its center frequency to the frequency corresponding to the frequency offset f1.

Further, when the random frequency offset generator 302 generates frequency offset information indicating the frequency offset f2, it controls the select switch 342 so that it is connected to the bandpass filter 340-2. When the random frequency offset generator 302 is connected to the bandpass filter 340-2 through the select switch 342, it outputs the frequency offset information indicating the frequency offset f2 to the bandpass filter 340-2. Then, the bandpass filter 340-2 changes its center frequency to the frequency corresponding to the frequency offset f2. The same applies to the other frequency offsets.

As a result, the bandpass filter 340 can separate a signal for each of the frequency offsets of the reflected pulses detected by the optical interference unit 130 (the detection unit 8) even when the frequency offset is randomly determined. Further, in the third example embodiment, a transmission pulse and a reflected pulse having frequency offsets corresponding to each other are associated with each other by the distance calculation unit 160. Therefore, the distance calculation unit 160 can calculate the distance R by associating a measurement start trigger related to a transmission pulse having a certain frequency offset with a measurement stop trigger related to a reflected pulse having this frequency offset. Therefore, even in the third example embodiment, it is possible to properly measure a distance to a distance-measurement-target object irrespective of the distance thereto or the transmission period of transmission pulses.

Further, by randomly generating frequency offsets, it is possible to prevent the distance measurement from being hampered. That is, when a plurality of frequency offsets are set to fixed values as in case of the first example embodiment, the plurality of frequencies of the optical signal including transmission pulses have also fixed values. As a result, the frequencies of the optical signal are easily detected, so that the optical signal is easily intercepted. Further, since the optical signal is easily intercepted, interfering light can be easily emitted, so that the distance measurement can be hampered. In contrast to this, by randomly setting frequency offsets as in the case of the third example embodiment, it becomes difficult to detect the frequencies of the optical signal including transmission pulses. Therefore, it is possible to prevent the distance measurement from being hampered.

Further, due to the characteristics of the devices or the reflection characteristics of the distance-measurement-target object 90, there may be cases where measurement errors occur more likely when the distance measurement is carried out by using a certain frequency. In such cases, when a frequency offset is set to a fixed value, a possibility that a measurement error occurs increases when the distance measurement is carried out by using a transmission pulse having this frequency offset. In contrast to this, by randomly setting the frequency offsets as in the case of the third example embodiment, measurement errors can be averaged (leveled out), so that the accuracy of the distance measurement is improved. This feature may be particularly effective when the certain frequency at which measurement errors are likely to occur is unknown.

Note that the distance-measurement apparatus 300 according to the third example embodiment includes the select switch 342 and the bandpass filters 340 capable of changing their center frequencies. The structure of the distance-measurement apparatus 300 having such a configuration is more complicated as compared to the distance-measurement apparatus 100 according to the first example embodiment. In other words, since the distance-measurement apparatus 100 according to the first example embodiment uses the predetermined frequency offsets, it does not require the select switch 342 and the bandpass filters do not have to be able to change their center frequencies, so that the structure thereof can be simplified.

Modified Example

Note that the present invention is not limited to the above-described example embodiments, and they may be modified as appropriate without departing from the spirit and scope of the invention. For example, although the optical signal is separated for each of the frequency offsets of the reflected pulses by using the bandpass filters in the above-described example embodiment, the present invention is not limited to such a configuration. The signal may be separated by using a component(s) other than the bandpass filter. Further, if the receiving timing of the reflected pulse can be extracted for each frequency offset, the received optical signal does not need to be separated. However, by separating the optical signal for each of the frequency offsets of the reflected pulses by using the bandpass filter, it is possible to perform the distance-measurement processing at a high speed as described above. Further, by separating the optical signal for each of the frequency offsets of the reflected pulses by using the bandpass filter, the receiving timing of each reflected pulse can be easily extracted.

Further, the distance calculation unit 160 may take the processing time in the optical modulator 106 and the like into consideration when determining the timing at which the measurement start trigger is output. In other words, the distance calculation unit 160 may take account of the processing time from when the measurement start trigger is received to when the transmission pulse corresponding to the measurement start trigger is actually transmitted. In this case, the distance calculation unit 160 may use the timing that is obtained by adding the processing time in the optical modulator 106 and the like to the output timing of the measurement start trigger as the start timing of the distance measurement. Note that it is assumed that the processing time in the optical modulator 106 and the like is roughly constant.

Similarly, the distance calculation unit 160 may take the processing time of the optical interference-system unit 130 and the like until the measurement stop trigger is output into consideration when determining the measurement stop trigger. In other words, the distance calculation unit 160 may take account of the processing time from when the reflected pulse is received by the optical reception unit 122 to when the measurement stop trigger is output by the timing extraction unit 150. In this case, the distance calculation unit 160 may use the timing that is obtained by subtracting the processing time of the optical interference-system unit 130 and the like from the output timing of the measurement stop trigger as the end timing of the distance measurement. Note that it is assumed that the processing time in the optical interference-system unit 130 and the like is roughly constant.

Alternatively, the modulation signal generation unit 104 may output a measurement start trigger indicating a time at which the transmission pulse is transmitted while taking into account of the processing time until the transmission pulse is transmitted by the optical transmission unit 120 located in the subsequent stage (i.e., located on the output side thereof). That is, when the time at which the modulation signal is generated is represented by t1 and the processing time in the optical modulator 106 and the like is represented by $\Delta t1$, the modulation signal generation unit 104 may output a measurement start trigger indicating a time (t1+$\Delta t1$). The same applies to the transmission pulse generation unit 204 according to the second example embodiment and the modulation signal generation unit 304 according to the third example embodiment. Similarly, the timing extraction unit 150 may output a measurement stop trigger indicating a time at which the reflected pulse is received while taking account of the processing time in the optical interference-system unit 130 and the like located in the preceding stage (i.e., located on the input side thereof). That is, when the time at which the timing extraction unit 150 receives a signal from the bandpass filter 140 is represented by t2 and the processing time in the optical interference-system unit 130 and the like is represented by $\Delta t2$, the timing extraction unit 150 may output a measurement stop trigger indicating a time (t2−$\Delta t2$). In this case, the distance calculation unit 160 may calculate the distance R, by using the Expression 1, according to a relation Td=(t2−$\Delta t2$)−(t1+$\Delta t1$)

Further, the frequency offset generator 102 may output frequency offset information indicating all the frequency offsets f1, f2, . . . , fn to the modulation signal generation unit 104. In this case, the modulation signal generation unit 104 may generate modulation signals corresponding to the frequency offsets f1, f2, . . . , fn, respectively, at each pulse period Tp.

Note that although the example embodiment is described as a hardware configuration in the above-described example embodiments, the example embodiment is not limited to the hardware configurations. In the example embodiment, at least one processing in each circuit in the distance-measurement apparatus can also be implemented by having a CPU (Central Processing Unit) execute a computer program.

In the above-described examples, the program can be stored and provided to a computer using any type of non-transitory computer readable media. Non-transitory computer readable media include any type of tangible storage media. Examples of non-transitory computer readable media include magnetic storage media (e.g., floppy disks, magnetic tapes, hard disk drives, etc.), optical magnetic storage media (e.g., magneto-optical disks), CD-ROM (Read Only Memory), CD-R, CD-R/W, and semiconductor memories (e.g., mask ROM, PROM (Programmable ROM), EPROM (Erasable PROM), flash ROM, and RAM (Random Access Memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a radio communication line.

Although the present invention is explained above with reference to example embodiments, the present invention is not limited to the above-described example embodiments. Various modifications that can be understood by those skilled in the art can be made to the configuration and details of the present invention within the scope of the invention.

The whole or part of the example embodiments disclosed above can be described as, but not limited to, the following supplementary notes.

(Supplementary Note 1)

A distance-measurement apparatus comprising
generation means for generating a plurality of transmission pulses of which a strength of an optical signal changes in a pulse-like manner, the plurality of transmission pulses having frequency offsets different from each other with respect to a reference frequency;
transmission means for repeatedly transmitting the generated transmission pulses;
reception means for receiving reflected pulses of the transmission pulses reflected on a distance-measurement-target object;
detection means for detecting frequency offsets of the received reflected pulses; and
distance calculation means for calculating a distance to the distance-measurement-target object based on receiving timings of the received reflected pulses and transmitting timings of the transmission pulses corresponding to the frequency offsets detected from the reflected pulses.

(Supplementary Note 2)

The distance-measurement apparatus described in Supplementary note 1, wherein
the reception means receives an optical signal including the reflected pulses,
the distance-measurement apparatus further comprises separation means for separating the received optical signal for each of the frequency offsets of the reflected pulses detected by the detection means, and
the distance calculation means calculates the distance to the distance-measurement-target object for each of the separated optical signals.

(Supplementary Note 3)

The distance-measurement apparatus described in Supplementary note 1 or 2, wherein the generation means generates the plurality of transmission pulses having the frequency offsets different from each other by modulating an optical signal emitted from a light source into an optical signal having a different frequency for each of the transmission pulses, the light source being configured to emit an optical signal having the reference frequency.

(Supplementary Note 4)

The distance-measurement apparatus described in any one of Supplementary notes 1 to 3, wherein the generation means generates the plurality of transmission pulses having predetermined frequency offsets different from each other.

(Supplementary Note 5)

The distance-measurement apparatus described in any one of Supplementary notes 1 to 3, wherein the generation means generates the plurality of transmission pulses having random frequency offsets different from each other.

(Supplementary Note 6)

The distance-measurement apparatus described in Supplementary note 1, wherein
the reception means receives an optical signal including the reflected pulses,
the distance-measurement apparatus further comprises separation means for separating the received optical signal for each of the frequency offsets of the reflected pulses detected by the detection means, and
the generation means generates the plurality of transmission pulses having random frequency offsets different from each other, and transmits frequency offset information indicating the random frequency offsets to the separation means,
the separation means changes the frequency offset of the optical signal, which should be separated, according to the frequency offset information, and the distance calculation means calculates the distance to the distance-measurement-target object for each of the separated optical signals.

(Supplementary Note 7)

A distance-measurement method comprising:
generating a plurality of transmission pulses of which a strength of an optical signal changes in a pulse-like manner, the plurality of transmission pulses having frequency offsets different from each other with respect to a reference frequency;
repeatedly transmitting the generated transmission pulses;
receiving reflected pulses of the transmission pulses reflected on a distance-measurement-target object;
detecting frequency offsets of the received reflected pulses; and
calculating a distance to the distance-measurement-target object based on receiving timings of the received reflected pulses and transmitting timings of the transmission pulses corresponding to the frequency offsets detected from the reflected pulses.

(Supplementary Note 8)

The distance measurement method described in Supplementary note 7, wherein
an optical signal including the reflected pulses is received,
the received optical signal is separated for each of the frequency offsets of the detected reflected pulses, and
the distance to the distance-measurement-target object is calculated for each of the separated optical signals.

(Supplementary Note 9)

The distance-measurement method described in Supplementary note 7 or 8, wherein the plurality of transmission pulses having the frequency offsets different from each other are generated by modulating an optical signal emitted from a light source into an optical signal having a different frequency for each of the transmission pulses, the light source being configured to emit an optical signal having the reference frequency.

(Supplementary Note 10)

The distance-measurement method described in any one of Supplementary notes 7 to 9, wherein the plurality of transmission pulses having predetermined frequency offsets different from each other are generated.

(Supplementary Note 11)

The distance-measurement method described in any one of Supplementary notes 7 to 9, wherein the plurality of transmission pulses having random frequency offsets different from each other are generated.

(Supplementary Note 12)

The distance-measurement method described in Supplementary note 7, wherein
the plurality of transmission pulses having random frequency offsets different from each other are generated,
an optical signal including the reflected pulses is received,
the frequency offset of the optical signal, which should be separated, is changed according to the frequency offset information, and the received optical signal is separated for each of the frequency offsets of the detected reflected pulses, and the distance to the distance-measurement-target object is calculated for each of the separated optical signals.

REFERENCE SIGNS LIST

1 DISTANCE-MEASUREMENT APPARATUS
2 GENERATION UNIT
4 TRANSMISSION UNIT
6 RECEPTION UNIT
8 DETECTION UNIT
10 DISTANCE CALCULATION UNIT
100 DISTANCE-MEASUREMENT APPARATUS
102 FREQUENCY OFFSET GENERATOR
104 MODULATION SIGNAL GENERATION UNIT
106 OPTICAL MODULATOR
108 LIGHT SOURCE
110 PULSE GENERATION UNIT
120 OPTICAL TRANSMISSION UNIT
122 OPTICAL RECEPTION UNIT
130 OPTICAL INTERFERENCE UNIT
132 OPTICAL/ELECTRICAL CONVERSION UNIT
134 AD CONVERTER
140 BANDPASS FILTER
150 TIMING EXTRACTION UNIT
160 DISTANCE CALCULATION UNIT
200 DISTANCE-MEASUREMENT APPARATUS
202 LIGHT SOURCE
204 TRANSMISSION PULSE GENERATION UNIT
206 DELAY UNIT
208 MULTIPLEXER
210 PULSE GENERATION UNIT
224 LIGHT SOURCE
300 DISTANCE-MEASUREMENT APPARATUS
302 RANDOM FREQUENCY OFFSET GENERATOR
304 MODULATION SIGNAL GENERATION UNIT
310 PULSE GENERATION UNIT
340 BANDPASS FILTER
342 SELECT SWITCH

What is claimed is:

1. A distance-measurement apparatus comprising:
   a generation circuit configured to generate a plurality of transmission pulses of which a strength of an optical signal changes in a pulse-like manner, the plurality of transmission pulses having frequency offsets different from each other with respect to a reference frequency;
   a transmission circuit configured to repeatedly transmit the generated transmission pulses;
   a reception circuit configured to receive reflected pulses of the transmission pulses reflected on a distance-measurement-target object;
   a detection circuit configured to detect frequency offsets of the received reflected pulses;
   timing extraction circuit configured to extract a receiving timing of the received reflected pulse, for each of different frequency offsets; and
   a distance calculation circuit configured to calculate a distance to the distance-measurement-target object based on the receiving timings of the received reflected pulses and transmitting timings of the transmission pulses corresponding to the frequency offsets detected from the reflected pulses.

2. The distance-measurement apparatus according to claim 1, wherein
   the reception circuit receives an optical signal including the reflected pulses,
   the distance-measurement apparatus further comprises a separation circuit for separating the received optical signal for each of the frequency offsets of the reflected pulses detected by the detection circuit, and
   the distance calculation circuit calculates the distance to the distance-measurement-target object for each of the separated optical signals.

3. The distance-measurement apparatus according to claim 1, wherein the generation circuit generates the plurality of transmission pulses having the frequency offsets different from each other by modulating an optical signal emitted from a light source into an optical signal having a different frequency for each of the transmission pulses, the light source being configured to emit an optical signal having the reference frequency.

4. The distance-measurement apparatus according to claim 1, wherein the generation circuit generates the plurality of transmission pulses having predetermined frequency offsets different from each other.

5. The distance-measurement apparatus according to claim 1, wherein the generation circuit generates the plurality of transmission pulses having random frequency offsets different from each other.

6. The distance-measurement apparatus according to claim 1, wherein
   the reception circuit receives an optical signal including the reflected pulses,
   the distance-measurement apparatus further comprises a separation circuit configured to separate the received optical signal for each of the frequency offsets of the reflected pulses detected by the detection circuit, and
   the generation circuit generates the plurality of transmission pulses having random frequency offsets different from each other, and transmits frequency offset information indicating the random frequency offsets to the separation circuit,
   the separation circuit changes the frequency offset of the optical signal, which should be separated, according to the frequency offset information, and
   the distance calculation circuit calculates the distance to the distance-measurement-target object for each of the separated optical signals.

7. A distance-measurement method comprising:
   generating a plurality of transmission pulses of which a strength of an optical signal changes in a pulse-like manner, the plurality of transmission pulses having frequency offsets different from each other with respect to a reference frequency;
   repeatedly transmitting the generated transmission pulses;
   receiving reflected pulses of the transmission pulses reflected on a distance-measurement- target object;
   detecting frequency offsets of the received reflected pulses;
   extracting a receiving timing of the received reflected pulse, for each of different frequency offsets; and
   calculating a distance to the distance-measurement-target object based on the receiving timings of the received reflected pulses and transmitting timings of the transmission pulses corresponding to the frequency offsets detected from the reflected pulses.

8. The distance measurement method according to claim 7, wherein an optical signal including the reflected pulses is received,
   the received optical signal is separated for each of the frequency offsets of the detected reflected pulses, and the distance to the distance-measurement-target object is calculated for each of the separated optical signals.

9. The distance-measurement method according to claim 7, wherein the plurality of transmission pulses having the frequency offsets different from each other are generated by modulating an optical signal emitted from a light source into an optical signal having a different frequency for each of the transmission pulses, the light source being configured to emit an optical signal having the reference frequency.

10. The distance-measurement method according to claim 7, wherein the plurality of transmission pulses having predetermined frequency offsets different from each other are generated.

11. The distance-measurement method according to claim 7, wherein the plurality of transmission pulses having random frequency offsets different from each other are generated.

12. The distance-measurement method according to claim 7, wherein
   the plurality of transmission pulses having random frequency offsets different from each other are generated,
   an optical signal including the reflected pulses is received,
   the frequency offset of the optical signal, which should be separated, is changed according to the frequency offset information, and the received optical signal is separated for each of the frequency offsets of the detected reflected pulses, and
   the distance to the distance-measurement-target object is calculated for each of the separated optical signals.

* * * * *